United States Patent
Moritz et al.

(10) Patent No.: US 10,706,144 B1
(45) Date of Patent: Jul. 7, 2020

(54) CYBER DEFENSE WITH GRAPH THEORETICAL APPROACH

(71) Applicant: BlueRISC, Inc., Amherst, MA (US)

(72) Inventors: Csaba Andras Moritz, Amherst, MA (US); Kristopher Carver, Belchertown, MA (US); Santosh Khasanvis, Amherst, MA (US); Jeffry Gummeson, Hadley, MA (US)

(73) Assignee: BlueRISC, Inc., Amherst, MA (US)

( * ) Notice: Subject to any disclaimer, the term of this patent is extended or adjusted under 35 U.S.C. 154(b) by 0 days.

(21) Appl. No.: 15/261,326

(22) Filed: Sep. 9, 2016

(51) Int. Cl.
  *G06F 21/55* (2013.01)
  *G06F 21/56* (2013.01)

(52) U.S. Cl.
  CPC .............. *G06F 21/55* (2013.01); *G06F 21/56* (2013.01); *G06F 2221/034* (2013.01)

(58) Field of Classification Search
  CPC ........ G06F 21/55; G06F 21/56; G06F 21/554; G06F 21/561; G06F 21/563; G06F 21/564; G06F 21/565; G06F 21/566; G06F 21/577; G06F 2221/034; H04L 63/1433
  USPC .......................................................... 726/23
  See application file for complete search history.

(56) References Cited

U.S. PATENT DOCUMENTS

| | | | |
|---|---|---|---|
| 6,609,201 B1 | 8/2003 | Folmsbee | |
| 6,970,985 B2 | 11/2005 | Moritz | |
| 7,493,607 B2 | 2/2009 | Moritz | |
| 7,996,671 B2 | 8/2011 | Chheda et al. | |
| 8,327,249 B2 | 12/2012 | Jorda et al. | |
| 8,600,718 B1* | 12/2013 | Stepaniants ............ G16B 20/00 703/11 |
| 8,607,209 B2 | 12/2013 | Chheda et al. | |
| 9,411,964 B1 | 8/2016 | Moritz et al. | |
| 9,754,112 B1 | 9/2017 | Moritz et al. | |
| 9,940,445 B2 | 4/2018 | Moritz et al. | |
| 10,101,978 B2 | 10/2018 | Moritz | |
| 10,225,075 B1 | 3/2019 | Moritz | |
| 10,230,702 B1 | 3/2019 | Moritz | |
| 10,248,792 B1 | 4/2019 | Moritz et al. | |
| 10,430,565 B2 | 10/2019 | Moritz et al. | |
| 2005/0114850 A1 | 5/2005 | Chheda et al. | |
| 2007/0044153 A1 | 2/2007 | Schuba et al. | |
| 2007/0294181 A1 | 12/2007 | Chheda et al. | |
| 2008/0034355 A1 | 2/2008 | Shen et al. | |
| 2008/0126766 A1 | 5/2008 | Chheda et al. | |
| 2008/0276227 A1 | 11/2008 | Greifeneder | |
| 2009/0282480 A1 | 11/2009 | Lee et al. | |
| 2011/0126288 A1 | 5/2011 | Schloegel et al. | |

(Continued)

OTHER PUBLICATIONS

Aho, A. V. et al., Compilers—Principles, Techniques, and Tools; Addison-Wesley, Reading, MA (1986).

(Continued)

*Primary Examiner* — Ashokkumar B Patel
*Assistant Examiner* — William B Jones
(74) *Attorney, Agent, or Firm* — Burns & Levinson, LLP

(57) ABSTRACT

An example process that is performed by one or more processing devices uses one or more system states to detect cyber-attacks. The example process includes the following operations: generating a first graph that models states based on information obtained from an electronic device; and performing a correlation of the first graph with one or more second graphs to detect a possibility of a cyber-attack against the electronic device.

40 Claims, 13 Drawing Sheets

(56) References Cited

U.S. PATENT DOCUMENTS

| | | |
|---|---|---|
| 2013/0205285 A1 | 8/2013 | Pizlo |
| 2014/0164519 A1* | 6/2014 | Shah ................... H04L 67/306 709/204 |
| 2014/0181980 A1 | 6/2014 | Christodorescu et al. |
| 2014/0283040 A1 | 9/2014 | Wilkerson et al. |
| 2015/0293896 A1* | 10/2015 | Runkis ................. H04L 63/168 707/755 |
| 2015/0363598 A1 | 12/2015 | Xu et al. |
| 2016/0224789 A1* | 8/2016 | Feroz ................... G06F 21/566 |
| 2018/0048662 A1* | 2/2018 | Jang .................... H04L 63/1425 |
| 2018/0069885 A1* | 3/2018 | Patterson ............. G06F 21/554 |

OTHER PUBLICATIONS

Alternative to itoa() for converting integer to string C++?, 8 pages (Oct. 23, 2008). URL: http://stackoverflow.com/questions/228005/alternative-to-itoa-for-converting-integer-to-string-c [Retrieved Jun. 21, 2016].

Anderson, R. and Kuhn, M., Tamper Resistance—A Cautionary Note, Proceedings of Second USENIX Workshop on Electronic Commerce, (1996).

Brumley, D. et al., Sting: An End-to-End Self-Healing System for Defending against Internet Worms, 31 pages (Nov. 2005). URL: http://www.cs.berkeley.edu/~dawnsong/papers/2007%20sting-bookchapter-06.pdf [Retrieved Feb. 19, 2016].

Coppola, M., Owning the Network: Adventures in Router Rootkits, Virtual Security Research, LLC. (2012).

Cui, A. and Stolfo, S., Defending Legacy Embedded Systems with Software Symbiotes, The 14th International Symposium on Recent Advances in Intrusion Detection (RAID), 358-377 (2011).

Department of Homeland Security, Critical Infrastructure Sectors, 4 pages (2016). URL: http://www.dhs.gov/criticalinfrastructure-sectors [Retrieved Jun. 21, 2016].

Diskin, G., Binary Instrumentation for Security Professionals, Intel, Blackhat USA (2011).

File History of U.S. Appl. 14/551,341, filed Nov. 24, 2014 (Retrieved Jan. 30, 2017).

File History of U.S. Appl. 14/551,508, filed Nov. 24, 2014 (Retrieved Jan. 30, 2017).

File History of U.S. Appl. 15/193,935, filed Jun. 27, 2016 (Retrieved Jan. 30, 2017).

Gartner, Gartner Says Internet of Things Installed Base Will Grow to 26 Billion Units by 2020, 4 pages (Dec. 12, 2013). URL: http://www.design-reuse.com/news/33491/gartner-internet-of-things.html [Retrieved Feb. 19, 2016].

Gilmont, T. et al., Hardware security for software privacy support, Electronics Letters, 35(24):2096-2097 (1999).

Jenei, S., Anti-Stacking Provisions Can Help Minimize Total Royalty Burden, 3 pages (Mar. 10, 2006). URL: http://www.patentbaristas.com/archives/2006/03/10/anti-stacking-provisions-can-help-minimize-total-royalty-burden, [Retrieved Feb. 19, 2016].

Jha, S., Software Security Issues in Embedded Systems, 2 pages. http://www.cs.wisc.edu/~jha [Retrieved Feb. 19, 2016].

Kean, T., Secure Configuration of Field Programmable Gate Arrays, Proceedings of the 11th International Conference on Field-Programmable Logic and Applications, 19 pages (2001).

Kerner, S.M., Network Equipment Market Growing to $51 Billion by 2015, 2 pages (May 11, 2011). URL: http://www.internetnews.com/infra/article.php/3933236/Network+Equipment+Market+Growing+to+51+Billion+by+2015.htm, [Retrieved Feb. 19, 2016].

Kolodgy, C.J., Market Analysis: Worldwide Security and Vulnerability Management 2011-2015 Forecast and 2010 Vendor Shares, 1:31 pages (Aug. 2013). URL: http://www.qualys.com/docs/idc_VM_forecast2012.pdf [Retrieved Feb. 19, 2016].

Kommerling, O. and Kuhn, M.G., Design Principles for Tamper-Resistant Smartcard Processors, USENIX Workshop on Smartcard Technology, 13 pages (1999).

Lie, D., Architectural support for copy and tamper resistant software, Proceedings of the 6th International Conference Architectural Support for Programming Languages and Operating Systems, 10 pages (2000).

Messerges, T.S. et. al., Examining Smart Card Security under the threat of Power Analysis, IEEE Transactions on Computers, 51(5):541-552 (2002).

MTC Group Ltd., Morpher-Crypt the Script, 3 pages (May 14, 2010). URL: http://morpher.com [Retrieved Jun. 21, 2016].

Non Final Rejection for U.S. 14/551,341, 7 pages (dated Nov. 2, 2016).

Open Wrt Attitude Adjustment Router Firmware, 3 pages (2016). URL: https://dev.openwrt.org/log/branches/attitude_adjustment [Retrieved Feb. 19, 2016].

Pranith, D.K. et al., Hybrid Analysis of Executables to Detect Security Vulnerabilities, Proceedings of the 2nd India Software Engineering Conference, 141-142 (2009).

Reeves, J., Autoscopy Jr.: Intrusion Detection for Embedded Control Systems, Dartmouth Computer Science Technical Report TR2011-704, 97 pages (Aug. 2011).

Research and Markets: Industrial Control Systems (ICS) Security Market—Global Advancements, Market Forecast & Analysis (2013-2018), 5 pages (Nov. 19, 2013).

Schwarz, B. et al., Disassembly of executable code revisited, IEEE Working Conference on Reverse Engineering, 10 pages (2002).

Skorobogatov, S., Breaking Copy Protection in Microcontrollers, 13 pages (2001). URL: http//:www.cl.cam.ac.uk/~sps32/mcu_lock.html [Retrieved May 12, 2016].

Skorobogatov, S., Tamper Resistance and Physical Attacks, ECRYPT 2006 Summer School on Cryptology, 68 pages (2006).

Slobojan, R., Critical Security Vulnerability Found in QuickSort, 4 pages (Apr. 1, 2009). URL: http://www.infoq.com/news/2009/04/quicksort-security-vulnerability [Retrieved Feb. 19, 2016].

Srivastava, A. and Eustace, A., Atom: A system for building customized program analysis tools, Proceedings of the ACM SIGPLAN 94 Conference on Programming Language Design and Implementation, 196-205 (1994).

Vinciguerra, L. et al., An experimentation framework for evaluating disassembly and decompilation tools for C++ and Java, IEEE Working Conference on Reverse Engineering, 14-23 (2003).

Weinghart, S.H., Physical Security Devices for Computer Subsystems: A Survey of Attacks and Defenses, Workshop on Cryptographic Hardware and Embedded Systems—CHES2000, 302-317 (2000).

File History of U.S. Appl. No. 15/674,084, 157 pages (Retrieved Aug. 28, 2018).

File History of U.S. Pat. No. 9,411,964, 222 pages (Retrieved Aug. 28, 2018).

File History of U.S. Pat. No. 9,754,112, 258 pages (Retrieved Aug. 28, 2018).

File History of U.S. Appl. No. 15/193,935, 366 pages (Retrieved Aug. 28, 2018).

Keromytis, A.D., Characterizing Self-Healing Software Systems, Department of Computer Science, Columbia University, 12 pages (2007).

Kuhn et al., "Tamper Resistance—A Cautionary Note", Proc. of the 2nd USENIX Workshop on Electronics Commerce, 11 pgs. (1996).

K. Liu, K. Das, T. Grandison, and H. Kargupta. Privacy-preserving data analysis on graphs and social networks. In H. Kargupta, J. Han, P. Yu, R. Motwani, and V. Kumar, editors, Next Generation Data Mining. CRC Press, 2008.

* cited by examiner

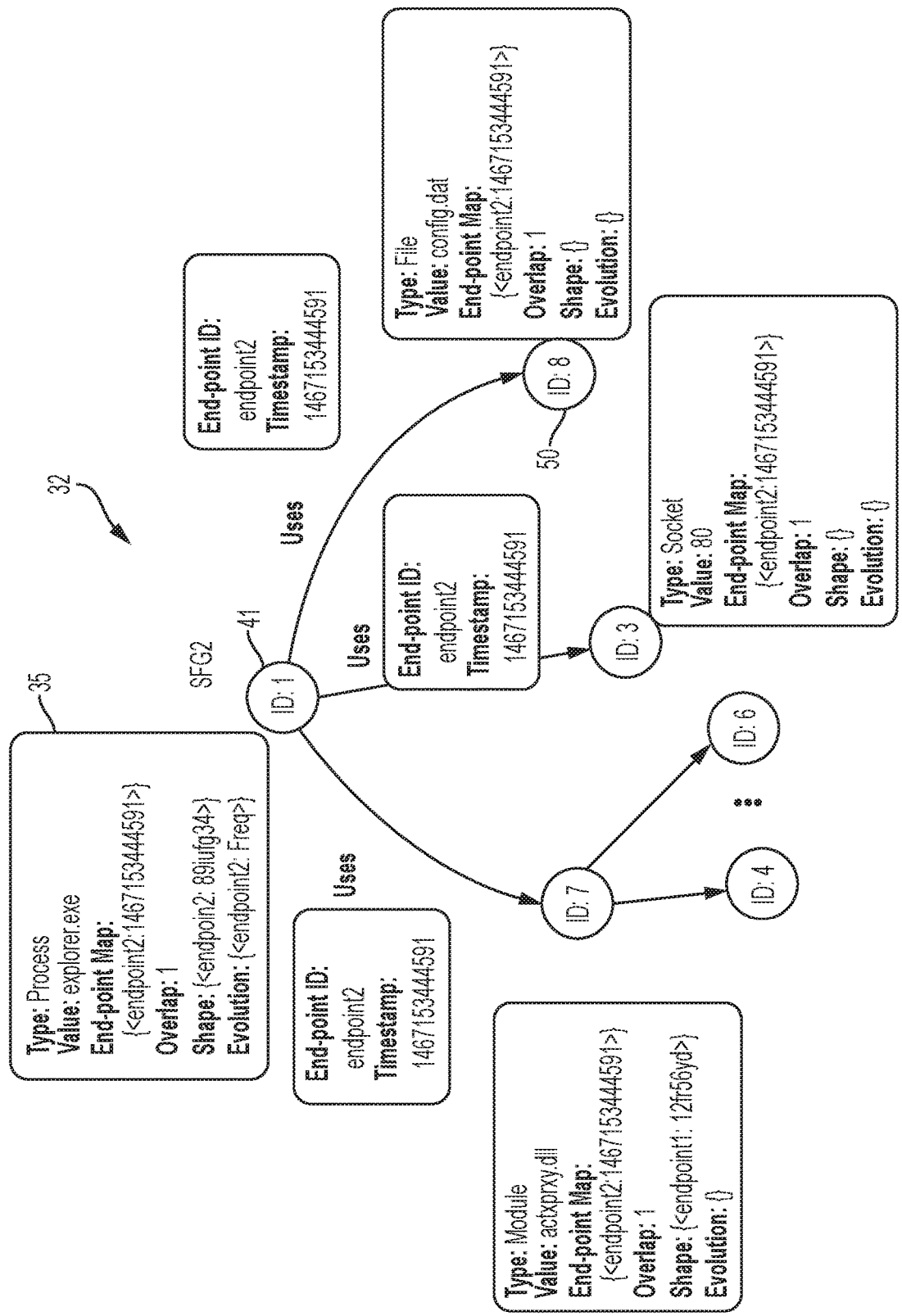

55

Legend:

$D = (v, E)$: healthy super-SFG for a given system config.

$D_i^t = (v_i^t(w), E_i^t)$: SFG for endpoint $i$ at time $t$ $v(w)$: Vertex with weight $w$ in $D$ $v_i^t(w)$: Vertex with weight $w$ in $D_i^t$ $(i, t)$: Tuple containing values for endpoint ID $i$ at time $t$ $OC(w)$: Overlap-Count for $v(w)$ in $D$ $OF$: Overlap frequency metric (a) Overlap-Count Update Process:

Given $D$ and $D_i^t$

For each $v_i^t(w)$ in $D_i^t$
   $v(w) = queryVertexWithWeight(D, w)$;
   If $v(w)$ is not null then
     $OC(w) = getOverlapCount (v(w))$;
     If getEndPointMap($v(w)$) does not contain $(i, t)$ then
       $OC(w) = OC(w) + 1$;
       updateEndpointMap($v(w), (i, t)$);
       updateOverlapCount($v(w), OC(w)$);
    ELSE
      $OC(w) = 1$;
      Return PreviouslyUnseenNode;
END FOR
RETURN PreviouslySeenNode;

Legend:

$D = (v, E)$: Healthy super-SFG for a given system config.

$D_i^t = (v_i^t(w), E_i^t)$: SFG for endpoint $i$ at time $t$ $v(w)$: Vertex with weight $w$ in $D$ $v_i^t(w)$: Vertex with weight $w$ in $D_i^t$ $(i, t)$: Tuple containing values for endpoint ID $i$ at time $t$ $OC(w)$: Overlap-Count for $v(w)$ in $D$ $OF$: Overlap frequency metric <u>(b) Overlap-Frequency Analysis Process:</u>

Given $v_i^t(w)$ and parent $v_i^t(w')$ $v(w)$ = queryVertexWithWeight($D$, $w$);

if $v(w)$ is null then
    Return AtypicalBehaviorFound;
Else
    $OC(w)$ = getOverlapCount ($v(w)$);
    if getEndPointMap($v(w)$) does not contain $(i, t)$ then
        $OC(w)$ = $OC(w)$ + 1;
    $v(w')$ = queryParentVertexWithWeight($v(w)$, $w'$);
    if $v(w')$ is null then
        Return AtypicalBehaviorFound;
    Else
        $OF = OC(w) / OC(w')$;
        if $OF$ < ThresholdFrequency then
            Return AtypicalBehaviorFound;
    Return TypicalBehaviorFound;

FIG. 4

Legend:

$D = (v, E)$: Healthy super-SFG for a given system config.

$D_i^t = (v_i^t(w), E_i^t)$: SFG for endpoint $i$ at time $t$ $w = \{Type, Value\}$ $v(w)$: Vertex with weight $w$ in $D$ $v_i^t(w)$: Vertex with weight $w$ in $D_i^t$ $V_i^t(w)$: Set of selected vertices in $D_i^t$ $s_i^t(w, Type')$: Sharedness-Count for $v_i^t(w)$ in $D_i^t$ between parent nodes where $weight.type = Type'$ $S_{range}$: Range of previously observed values in $D$ for $s_i^t(w, Type')$ (a) Sharedness-Count Measurement Process:

Given $v_i^t(w)$ and parent vertex type = $Type'$ $V_i^t$ = queryParentVerticesWithWeight($v_i^t(w)$, $w'$)
          . filter($w'.type = Type'$);

Return count($V_i^t$);

Legend:
$D = (v, E)$: Healthy super-SFG for a given system config.
$D_i^t = (v_i^t(w), E_i^t)$: SFG for endpoint $i$ at time $t$
$w = \{Type, Value\}$
$v(w)$: Vertex with weight $w$ in $D$
$v_i^t(w)$: Vertex with weight $w$ in $D_i^t$
$V_i^t(w)$: Set of selected Vertices in $D_i^t$
$s_i^t(w, Type')$: Sharedness-Count for $v_i^t(w)$ in $D_i^t$ between parent nodes where $weight.type = Type'$
$S_{range}$: Range of previously observed values in D for $s_i^t(w, Type')$ (b) Sharedness Analysis Process:
Given $v_i^t(w)$, $s_i^t(w, Type')$ and parent vertex type = $Type'$
$v(w) = queryVertexWithWeight(D, w)$
if $v(w) =$ is null then
   Return AtypicalBehaviourFound;
Else
  Let $S_{range} = ()$; // Empty
  For each {endpoint $e$, time $t$} in getEndPointMap($v(w)$)
  do
      Let $s = getSharednessCount(v_e^t(w), Type')$;
      addToRange($S_{Range}, s$);
  End For
  if $S_{Range}$ does not contain $s_i^t(w, Type')$ then
      Return AtypicalBehaviourFound;
Return TypicalBehaviourFound;

FIG. 6

Legend:
$D = (v, E)$: Healthy super-SFG for a given system config.

$D_i^t = (v_i^t(w), E_i^t)$: SFG for endpoint $i$ at time $t$ $w = \{Type, Value\}$: Weight of a vertex $v(w)$: Vertex with weight $w$ in $D$ $v_i^t(w)$: Vertex with weight $w$ in $D_i^t$ $W_{child,i}^t$: Set of weights of child nodes for a given vertex in $D_i^t$ $W_{child}$: Set of weights of child nodes for a given vertex in $D$ $V_{NM} = (v_i^t(w))$: Set of vertices in $D_i^t$ that failed contiguousness check (not matched)

<u>Contiguousness Check Process:</u>

Given $D_i^t$

Let $V_{NM} = ()$; // Empty set

For each $v_i^t(w)$ in $D_i^t$ $v(w)$ = queryVertexWithWeight($D, w$);
    if $v(w)$ is null then
        addVertexToSet($V_{NM}, v_i^t(w)$);
    Else
        $W_{child,i}^t$ = getWeightsOfChildNodes($v_i^t(w)$);
        $W_{child}$ = getWeightsOfChildNodes($v(w)$);
        If $W_{child,i}^t \not\subseteq W_{child}$ then
            addVertexToSet($V_{NM}, v_i^t(w)$);
End For
Return $V_{NM}$;

Legend:
$D_j^t = (v_j^t(w), E_j^t)$: SFG for endpoint $i$ at time $t$
$w$ = {Type, Value}: Weight of a vertex
$v$: Vertex
$V_l$: Set of vertices at depth $l$ from root node Shape Extraction Process:
Given $D_j^t$
Let H = getHeight($D_j^t$);
For $l$ = H to 0 do
    For each $v \in V_l$ do
        Let $M_C$ = getMessageSetFromChildNodes($v$);
        if $M_C$ is not empty then
            $M_C$.sortMessagesByType();
            Let $n_C$ = getNumberOfChildNodes($v$);
            $v$.shape = createHash (concatenate($l$, $v.type$, $n_C$, $M_C$));
        Let $M_p$ = createMessageToParent($v.type$, $v.shape$);
        sendMessageToParentNode($v$, $M_p$);
    End For
End For
Return;

Legend:

$D = (v, E)$: Healthy super-SFG for a given system config.

$D_i^t = (v_i^t(w), E_i^t)$: SFG for endpoint $i$ at time $t$ $v(w)$: Vertex with weight $w$ in $D$ $v_i^t(w)$: Vertex with weight $w$ in $D_i^t$ Where an update/change was detected Evolution Check Process:

Given $v_i^t(w), i, t$ and $D$ $v(w)$ = queryVertexWithWeight($D, w$);
if $v(w)$ is null then
    AtypicalBehaviorFound;
Else
    $E_{Range}$ = getRangeOfEvolutionPeriods ($v(w)$);
    if $E_{range}$ is not empty then
        $t_0$ =
    getLastUpdatedTimeForEndpoint($v(w), i$);
        if $E_{range}$ does not contain ($t - t_0$) then
            Return AtypicalBehaviorFound;
Return TypicalBehaviorFound;

FIG. 9

CYBER DEFENSE WITH GRAPH THEORETICAL APPROACH

STATEMENT REGARDING GOVERNMENT RIGHTS

This invention was made with government support under contract no. HSHQDC-16-C-0065 awarded by the Department of Homeland Security. The government has certain rights in the invention.

TECHNICAL FIELD

This disclosure relates generally to using one or more system states to detect cyber-attacks.

BACKGROUND

Cyber-attacks can pose a significant concern to both government and corporate entities worldwide. Attackers can often circumvent conventional attack detection processes through slight modifications to how cyber-attacks are performed and/or through subtle changes to the attacking code itself.

Advanced cyber threats, such as advanced persistent threats (APT), have multiple phases. Rule-based and signature-based detection processes have been used in efforts to curb the proliferation of such multi-phase attacks. In the case of signature-based processes, the generation of valid signatures may take time, and their efficacy may be limited. Additionally, signatures may be used for individual files/processes in a system end point (or potentially at a network perimeter), while not taking into consideration the system as a whole or using analytics across many systems' memory. In some cases, the result can be a cyber-defensive posture that is easily bypassed and that is not prepared to defend against previously-unseen attacks or to predict next phases of an attack.

SUMMARY

An example process includes the following operations: generating a first graph that models states based on information obtained from an electronic device; and performing a correlation of the first graph with one or more second graphs to detect a possibility of a cyber-attack against the electronic device. The example process may include one or more of the following features, either alone or in combination.

The one or more second graphs may comprise one or more graphs that are known not to be subjected to cyber-attack. The one or more second graphs may comprise one or more graphs containing nodes having properties that are suspected to be a result of a cyber-attack. The electronic device may be a first electronic device; the one or more second graphs may comprise one or graphs for second electronic devices; and the second electronic devices may be different than the first electronic device. The one or more second graphs may comprise a combined super-graph comprised of merged individual graphs, where a node common to the individual graphs appears as a single node in the combined graph.

The correlation process may determine whether a node of the first graph has been encountered in the one or more second graphs. The correlation process may determine whether a shape of at least part of the first graph has one or more features in common with a shape of at least part of one or more of the second graphs. The correlation process may determine whether contiguous nodes of the first graph belong to a subgraph that matches other subgraphs across space and time. The correlation process may determine whether a node of the first graph has changed in a manner that coincides with changes to a node of the one or more second graphs. The correlation process may determine a number of times that a node of the first graph has been encountered in the one or more second graphs.

The example process may include one or more of the following operations alone or in combination: providing the electronic device with information about the possibility of a cyber-attack against the electronic device; characterizing the electronic device as healthy based on the correlation indicating that there is no cyber-attack against the electronic device; characterizing the electronic device as compromised based on the correlation indicating that there is a cyber-attack against the electronic device; and quarantining the first graph based on the correlation.

Generating the first graph may comprise: performing reverse engineering to identify locations of memory on the electronic device; accessing the locations of memory on the electronic device to obtain information about states of the electronic device; and constructing the first graph based on the information. The first graph may be generated based on information obtained from a binary executable for a known malware executable file. The first graph may be generated to reflect changes to states of the electronic device.

The correlation of the first graph may be performed by a cloud service; and the example process may comprises transmitting the first graph to the cloud service differentially. The example process may comprise compressing the first graph to produce a compressed graph; and transmitting the compressed graph to the cloud service differentially.

Generating a first graph may comprise: identifying locations of live memory on the electronic device; accessing the locations of live memory on the electronic device to obtain information about states of the electronic device; and constructing the first graph based on the information. Generating a first graph may comprise: obtaining information from a dump of memory on the electronic device; and constructing the first graph based on the information.

Two or more of the features described in this disclosure, including those described in this summary section, may be combined to form implementations not specifically described herein.

The various systems described herein, or portions thereof, may be implemented via a computer program product that includes instructions that are stored on one or more non-transitory machine-readable storage media, and that are executable on one or more processing devices (e.g., microprocessor(s), application-specific integrated circuit(s), programmed logic such as field programmable gate array(s), or the like). The systems described herein, or portions thereof, may be implemented as an apparatus, method, or electronic system that may include one or more processing devices and computer memory to store executable instructions to implement control of the stated functions.

The details of one or more implementations are set forth in the accompanying drawings and the description below. Other features, objects, and advantages will be apparent from the description and drawings, and from the claims.

DESCRIPTION OF THE DRAWINGS

FIG. 3 is an example of pseudocode for performing a correlation process based on an overlap count correlation metric.

FIG. 4 is an example of pseudocode for performing a correlation process based on an overlap frequency correlation metric.

FIG. 5 is an example of pseudocode for performing a process to extract a sharedness count correlation metric.

FIG. 6 is an example of pseudocode for performing a correlation process based on the sharedness count correlation metric.

FIG. 7 is an example of pseudocode for performing a correlation process based on an contiguousness correlation metric.

FIG. 8 is an example of pseudocode for performing a process to extract a shape of an SFG.

FIG. 9 is an example of pseudocode for performing a correlation process based on an evolution metric.

Like reference symbols in the various drawings indicate like elements.

DETAILED DESCRIPTION

Figure 1:
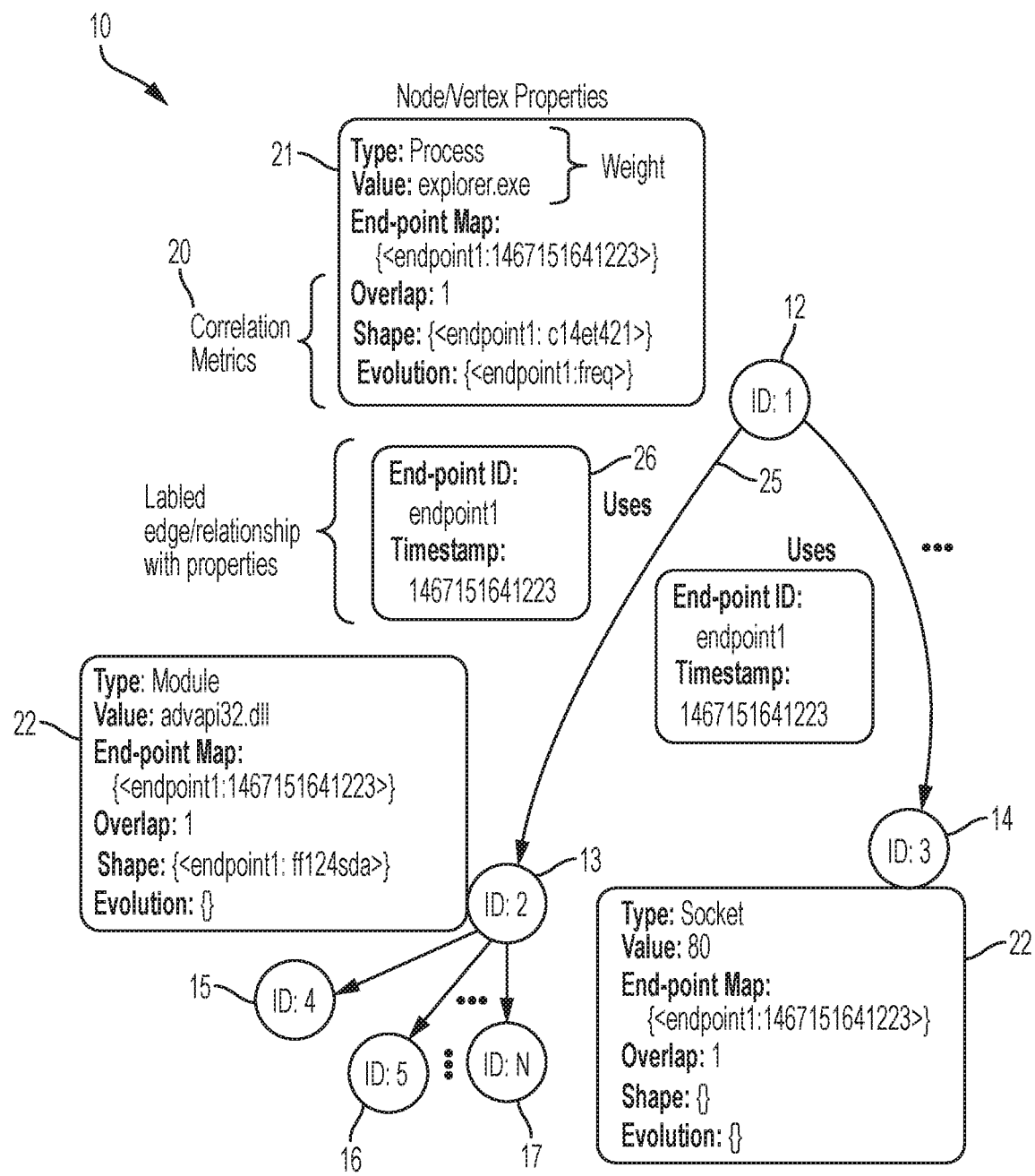
FIG. 1 is an example of a state forensics graph (SFG).

Described herein are example systems and processes for detecting, and predicting, cyber-attacks on devices, such as network end points. The systems and processes employ graphs—referred to as state forensics graphs (SFGs)—that model the state or state motion of a device in space and time. Correlation processes are performed using the graphs, or portions thereof, to identify state changes in space and/or time. Depending upon their context, these state changes may be benign or malicious. For example, changes made to numerous devices of like type may be indicative of routine software updates, in which case the changes are deemed benign and not indicative of a cyber-attack. By contrast, the changes may be specific or unique to a device as compared to other devices of like type, which may be indicative of a cyber-attack on that device. The example systems and processes identify such changes based, e.g., on the SFG correlations, and thereby identify, or predict, a cyber-attack. Information about the attack may be relayed to the device, network administrator, or other appropriate authority. Although the example systems and processes may be implemented in any appropriate technological context, they are described herein in a cloud-based system, which may include mobile and non-mobile device end points.

The cloud includes, but is not limited to, computing systems that are external to a user or device, and that may offer services to process data, store data, and/or transmit data. For example, the cloud may include, and be implemented using, a network of computers (e.g., servers and/or other types of processing devices), which may be accessible over one or public and/or private networks (e.g., the Internet and/or one or more intranets). Different computers in the cloud may perform different functions or the functions performed by different computers may be duplicated. For example, some computers may use computing resources to run applications or to deliver services, whereas other computers may perform other functions, such as data storage, load balancing, communications, network routing, and so forth. The cloud is typically accessible from any device through connection to a network. In the example processes described herein, one or more computers in the cloud may execute instructions to perform correlations of SFGs to identify the possibility of a cyber-attack on a device, and to take appropriate action based on the possibility, such as notifying the device or quarantining the SFG.

Software vulnerabilities are examples of defects in electronic devices (or simply, "devices") that may be exploited by third parties through cyber-attacks. Cyber-attacks include, but are not limited to, malware attacks, insider attacks, and other malicious cyber activities including, but not limited to, exfiltration of information that does not require changes to device software.

Examples of electronic devices include, but are not limited to, various forms of digital computers, examples of which include laptops, desktops, workstations, personal digital assistants, servers, blade servers, mainframes, and other appropriate computers. Examples of electronic devices also include, but are not limited to, various forms of mobile devices, examples of which include personal digital assistants, cellular telephones, smartphones, tablets, and other similar computing devices. Examples of electronic devices also include embedded processors, e.g., microprocessors, microcontrollers, or the like that are incorporated into what are normally non-intelligent devices and that are programmable to implement control, receipt of information, and reporting as part of "the Internet of Things" (IoT). Examples described herein of electronic devices, their connections, their relationships, and their functions are meant to be illustrative only, and are not meant to limit implementations of the technology described and/or claimed herein.

State motion includes changes relative to known states of a system. A system may be, or include, the example electronic devices described herein. For example, a state motion may identify which part or parts of system components and/or software components are running, and/or any changes thereto relative to known states, such as historical states from the same system or other systems. Each system may be, or include, a network end point device and may have software operating in its hardware to enable the network end point device's state to be represented by the content of its memory in conjunction with other information stored in the device or accessible by the device. Examples of state motion include, but are not limited to, system state changes, such as modifications to a virtual page in a module of software, access to/from network devices other than previously-encountered accesses or accesses by known systems, changes to input/output accesses, changes to registry keys, changes to core system data structures, changes to import and export functions, usage of software component(s) that are unexpected or unusual in context, changes to overall load, missing software components executing on a system, and so on forth.

The example processes described herein correlate graphs (SFGs) across space and time based on information that is part of the state motion of various end points. Correlation across space includes performing correlation based on states of different devices on a network. Correlation across time includes performing correlation based on states of the same device or of different devices on a network captured at different times. Correlation across space may include correlation of graphs of states of different devices, whereas correlation across time may include correlation of graphs of states of the same device at different times or of different devices at different times.

In some implementations, information in the graphs is obtained directly from devices' memory, e.g., from live memory, from prior memory dumps, and/or from a binary executable (for example, information may be extracted from known malware executable files in the device's memory). A memory dump includes one or more processes by which contents of the device's memory are output and stored in another storage location. The obtained information is used by the example processes to generate one or more graphs—SFG(s)—for the device, which represent relevant state(s) of the device in space or time. In general, information used to generate SFGs may be stored in the end points themselves and accessed therefrom, or stored elsewhere on the network or in other location(s) and accessed therefrom.

As noted, an SFG is a graph. As such, the SFG includes vertices—referred to as "nodes"—that are connected by edges to represent state(s) of a device and relationships among those states. Examples of information that may be included in, or used to construct, nodes in an SFG includes, but is not limited to, device information including its system software version and model, integrity hashes calculated for active virtual pages of process software on a device, virtual pages related to modules on a device such as dynamically linked libraries (DLLs), associated threads and related open files names on a device, network sockets on a device, registry keys, core system data structures and associated data segments, and import/export related information for a device. Imports may relate to information from, or about, modules that may be used in a computer-implemented process. Exports may relate to software components that may be exported for use in computer-implemented processes other than a computer-implemented process being modeled by an SFG. In addition, information from, or about, kernel data structures such, as an SSDT (System Services Descriptor Table) and an IDT (Interrupt Descriptor Table), may be captured and incorporated into an SFG.

In some implementations, an SFG can be generated by one or more machine-executable processes that perform operations to extract appropriate information, such as that described above, from a system. In some implementations, extraction may be implemented using system application programming interfaces (APIs) and/or reverse engineering processes. Reverse engineering processes may include using a software driver or other code to scan system physical memory and to identify appropriate information for inclusion in an SFG (in a manner similar to forensics). In an example, reverse engineering is performed to identify locations of physical memory maps corresponding to processes' virtual memory pages and to identify locations of critical operating system data structures. In some implementations, hashes are determined for virtual pages, e.g., at a common 4 Kbyte page granularity or another granularity if super pages are used or if a system operating system use a granularity other than pages. In some implementations, hashes are determined for names and other data structures identified in the information, and those hashes are incorporated into the SFG.

For example, hashes may be used to construct, or are incorporated into, individual nodes (a vertex) of an SFG. In some implementations, the root node of an SFG (e.g., the first, or top, node of the SFG) contains information related to the system (e.g., device) and the time when a state represented by the SFG was captured. Under that root node, for each process, a sub-SFG (also called a "subgraph") contains information about active processes represented using hashes, including, for example, process' active pages in memory.

The resulting hashes may be embedded in an SFG node, as appropriate. Edges of the SFG may connect the nodes. For example an edge may connect a node to other nodes representing input/output activity-related information, such as open file names or network sockets, child processes, modules, and so forth. If a module (such as a DLL) is used as part of a process, its page-related hashes, which may be interconnected by edges as appropriate, may appear as nodes under that process's virtual page. Since multiple processes may use modules, there may be edges connecting module nodes to nodes representing multiple processes in the SFG. Generally speaking, hash values are surrogates for much larger chunks of information such as 4 Kbytes. Use of hash values in place of actual values thus may reduce the bandwidth required for communication, reduce the memory required for storage, and simplify analyses.

If a process starts another process, a parent-child relationship is established, with the starting process being the parent and the started process being the child. This parent-child relationship may be captured by one or more edges, e.g., if both processes share access to input/output and/or other system resources. Operating system data structures and drivers may appear as nodes containing hash values under an SFG root node. Device driver virtual pages may be represented similarly using hashes and associated nodes. In some implementations, an SFG is a surrogate that occupies a fraction of storage relative to the device state(s) that it represents. In some implementations, SFG correlations of multiple devices and/or times enable prediction of suspicious system motion, as described herein.

In some implementations, SFGs are represented and stored using property graphs. To generate an SFG, data items and their relationships are recorded in memory (e.g., one or more storage devices) in a graph database (DB) as a property graph. A property graph contains connected vertices—also called nodes—(e.g., objects) having associated properties (e.g., key-value-pairs). The value for a given key can be either a simple data type (such as integer, string, bit, etc.) or a collection (such as lists and maps, nested to any degree). Relationships between nodes (e.g., directed edges of the graph) provide semantically relevant connections between two nodes, and can themselves have associated properties. These relationships allow data in storage to be linked together directly and, in some implementations, to be retrieved using a single operation or command.

FIG. 1 shows an example of an SFG 10. In the example FIG. 1, each node 12 to 17 (vertex of the graph) of the SFG has an identifier (ID) and associated properties. Node 12 corresponds to an explorer.exe process in a Windows® device. Nodes 13, 14 below node 12 in the SFG, in this example, include network socket node 14 having attributes such as port number, and node 13 which corresponds to an advapi.dll module. Below node 13, there are other nodes 15, 16, 17, each containing appropriate hash values and properties. For example, each node may contain data representing correlation metrics 20 such as those described below. Each node may also include properties 21 (for node 12), 22 (for node 13), 23 (for node 14), which define attributes of the node (e.g., what process the node represents, weight of the node, and appropriate correlation metrics). Edges, such as edge 25, between two nodes may also be annotated with a relationship properties 26. In this example, the relationship properties include a timestamp and in some implementations (e.g., where multiple SFGs are collapsed into one SFG) may include the source end point ID for the relationship.

In some implementations, each node of an SFG has type and/or value parameters associated therewith that individually or together correspond to a weight of a node under consideration. An SFG also contains additional properties, such as an end point map that identifies which end point SFGs contain a given node and a timestamp associated with a state. An SFG may also contain correlation metrics, such as overlap, shape, and evolution. Each directed edge of an SFG may be labeled and contain an end point ID and timestamp as properties.

In some implementations, correlation metrics, such as evolution, may be reserved (e.g., not present) and may be filled at the time the SFG is stored in the cloud. Shape is a metric that encodes a shape of an SFG under a particular SFG node, for example using a bit string encoding (or incidence and/or adjacency matrix) that is then hashed. In the example of FIG. 1, node 14 has a shape of "{ }" or "null" because there is no underlying subgraph. Overlap is a metric that represents a frequency of occurrence, here a count of a number of times that a construct, such as a page, has been encountered (e.g., saturated to some maximum value). Evolution is a metric that indicates a frequency of change observed for a node over time.

In the example of FIG. 1, nodes 15, 16, 17 may represent active pages used by the explorer.exe process of node 12 at the time of state capture and that belong to the advapi32.dll module of node 13. In this example, these nodes are represented by hash values of underlying virtual pages and their properties. For example, the overlap metric may capture that nodes have been used by processes other than explorer.exe in the device SFG. In an example, an overlap metric value of one means that the node has been seen once. Edges between nodes may represent uses and encode timestamp and device node ID information.

A number of SFGs may be merged into a single SFG. The single SFG may be annotated with appropriate state information and information about the individual SFGs, such as the device(s) that the individual SFGs represent and the time period(s) that they represent. These combined graphs are referred to herein as a super-SFG. Super-SFGs may use a single node where that same node is used in two components of the super-SFG. These common nodes may appear once in a super-SFG and may be annotated with information about their various origins; that is, about various devices, times, and the like that they model. Thus, a super-SFG comprises a combined graph comprised of merged individual SFGs, and a node common to the individual SFGs appears as a single node in the super-SFG. As a result, the size of the super-SFG may not necessarily grow linearly with the number of individual SFGs in the super-SFG.

The example processes may be implemented using a driver, which may be implemented in computer code that is run periodically, intermittently, or on demand. For example, the driver may be run in response to one or more events (e.g., a state change) that occur on a device or system. The driver is configured to generate an SFG from information obtained/extracted from, or about, a device, and to send the resulting SFG to another system. The information may be obtained from the device itself or from a system other than the device. The other system receives the SFG and executes SFG correlation (SFGC) code that is used to determine whether the device from which the SFG originated is possibly under cyber-attack or may be in danger of impending cyber-attack.

In some implementations, the other system, and thus the correlation processes, may be implemented by executing computer code on one or more processing devices in the cloud. For example, appropriate computer system(s) in the cloud (or elsewhere) are configured (e.g., programmed) to receive an SFG from a device, to perform correlations of the received SFG with other SFG(s) (e.g., SFGs of other devices, super-SFGs, or attack genomes—described below), and to respond to the device with detection information that is based on the correlations or take other appropriate action. For example, the detection information may include an indication of whether a cyber-attack was detected on the device based on correlations of the SFGs. In some implementations, the other system, and thus the correlations, may be implemented by a single organization, by part of an organization, or by part of a service outside the organization.

The example processes may employ graph theory, related analyses, and metrics in processes for correlating SFGs across space and time. As noted, correlation is performed, in some cases, to detect malicious system motion that may result from a cyber-attack. In some implementations, SFGs are correlated across a relatively large space-time population in different ways, e.g., in terms of degrees of overlap/trends/changes/frequency/evolution/shape and other SFG metrics, as opposed to simply identifying exact matches.

The correlation(s) performed may be used to generate attack genome SFGs (or simply, "attack genomes"). In some implementations, an attack genome is a special type of SFG. In some implementations, as compared to a device SFG, an attack genome contains only the portion of an SFG that represents state changes deemed as malicious and, in some implementations, a layer of healthy SFG nodes that bound, surround, encapsulate, or are otherwise adjacent to the nodes of the SFG that represents the state changes deemed as malicious. In this context, "healthy" includes individual nodes of an SFG or an entire SFG this is known not to be subject to a cyber-attack or other destructive anomaly.

In an attack genome SFG, each node in the layer of surrounding healthy SFG nodes may be marked with one or more attributes to identify that node as healthy. These healthy nodes may represent context information surrounding an attack. That is, the healthy nodes may provide information about a system, device, process, component, etc. leading up to, or following, a cyber or cyber-attack, but are not necessarily representative of a part of the attack itself. As an analogy, generation of an attack genome is similar to the extraction of a mutated string of DNA (deoxyribonucleic acid) in a biological system, in that only those strands of DNA that have changes are indicative of disease and are identified. Likewise, in the case of an SFG, in some implementations, only those nodes and/or sub-SFGs that have changed indicate a cyber-attack and, therefore, are identified in, and incorporated into, the attack genome. In some implementations, an attack genome is generic for a class of attacks. In some implementations, multiple attack genomes may be used to capture different classes of attacks. Attack genomes can be used, for example, to identify the existence of previously unseen malicious activity in other heterogeneous systems, and in predicting next operations in a multi-layered attack (such as in an APT). In the example processes, detection may involve first correlating with attack genomes before other stored SFGs.

More specifically, in some implementations, the example correlation processes described herein may first correlate a device SFG to known attack genomes. If the correlation result is positive, e.g., there are similarities between the SFG and the attack genome, then a cyber-attack is identified. The attack genome can then be used to predict how that cyber-attack will operate in the device, and the information about that prediction may be sent to the device. Correlating the SFG to an attack genome prior to correlation with other device SFGs, super-SFGs, or known healthy SFGs/super-SFGs can hasten detection of a cyber-attack. That is, correlating an SFG with multiple device SFGs in order to detect state changes, and determine what those state changes mean, may take more time than correlating the SFG first with an attack genome. However, correlation may also be performed with another SFG(s), since the attack genome may not cover a cyber-attack that can be detected through correlation with other device SFGs In some implementations, attack genomes represent a class of surrogate attack artifacts (e.g., for various attack phases), and may enable prediction of future cyber-attacks. These predictions, which may be made in a manner that is similar to attack recognition (e.g., by appropriate correlation processes over space and/or time between an SFG and an attack genome), may be performed using graph space-time motion correlations and do not necessarily require exact state matches. For example, in some implementations, polymorphic malware and APTs can be predicted using SFG-attack genome correlations. In this regard, polymorphic malware includes malware that has morphed from one form to another, without necessarily changing functionality, in order to avoid detection. In some implementations, the example processes enable third-party users to access a cloud infrastructure through an application programming interface (API) in order to query attack genomes.

Correlation of newly-generated SFGs with an existing population of SFGs or attack genomes stored, e.g., in memory in servers in the cloud, may be performed in the cloud. This correlation may enable capture and/or synthesis of new attack genomes autonomously, e.g., without user intervention. In some implementations, attack genomes may be created automatically, e.g., as the information that make up the attack genomes is identified. That is, new information about cyber-attacks may be made via correlation of SFGs with other SFGs or known healthy SFGs. This new information may be represented by state changes relative to the other SFGs or known healthy SFGs. These state changes may be extracted from the SFG under consideration, and used to generate new attack genomes or to supplement one or more existing attack genomes. For example, the state changes may be defined as a new attack genome, or the state changes may be merged into an existing attack genome.

Correlations performed across multiple systems enable the example process to distinguish system updates that are non-malicious from cyber-attacks. For example, if multiple systems experience the same state change at the same time, chances are that the state change is an update and not a cyber-attack. Accordingly, the state change may be characterized as benign.

As part of the example processes, various devices may periodically or intermittently send their generated SFGs to one or more devices executing appropriate computer code to perform the correlations described herein. As noted, those devices performing the correlations may be in the cloud. In some implementations, the SFGs that are sent may be in any appropriate form. For example, the SFGs sent may be any appropriate combination of compressed, encrypted, uncompressed, and unencrypted. In some implementations, the SFGs may be represented in eXtensible Markup Language (XML) such as GraphML, which may facilitate correlation and data mining operations.

In some implementations, an SFG may be, or include, a set of acyclic graphs, with different subgraphs (e.g., constituent graphs that make up an overall SFG) representing different device processes at different times. The acyclic graphs may be connected at a top point to a device-related parent node and have associated nodes. An SFG may be generated at runtime or, as noted, can be pre-processed from memory dumps or binary executables. Information can be also combined. In some implementations, generation of an SFG can be made similar to stringent memory reverse engineering methods used in static memory forensics, e.g., without relying on APIs, since APIs can be maliciously hooked.

As noted, an SFG includes multiple nodes connected by edges. In some implementations, the nodes of an SFG may represent integrity hashes for active virtual pages of processes and modules, threads, related open files' names, network sockets, registry keys, process information, module information, core system data structures, and/or import-exports. An SFG representation and pre-processing may reduce storage/communication size complexity relative to entire memory dumps.

In some implementations, SFGs are transmitted differentially and are compressed. In this context, differential transmission includes transmitting the SFG if/when changes occur in a device, or transmitting only the part of the SFG that has changed. Adding a cache of SFG nodes previously seen in a device may support this functionality. In the context of SFGs, an SFG cache mimics the operation of a processor cache in that a node replacement policy ensures that older nodes of an SFG that are not seen for some time are replaced with newer nodes.

In some implementations, a cache of SFG nodes may be implemented as a hash table of node and associated weights. Hash values for virtual pages seen, e.g., within a specified time-frame, and other node information, can be queried in such cache. If all new node weights in an SFG are already present in the cache, it may mean that there is no state motion that has occurred relative to a past SFG transmission. If there are some new nodes, there may be a need to transmit SFG information to the correlation system, but only the changed nodes and possibly some additional nodes, such as nodes adjacent to the changed nodes. Some nodes that are already present in the SFG may be sent in some implementations, e.g., to provide context for the changed nodes.

In some implementations of an example SFG cache, a super-SFG may be generated by merging existing SFGs' nodes that represent a time period. Edge relationships may then be encoded (e.g., defined) between nodes of the merged SFGs. A super-SFG may show nodes related to past states and how those nodes relate to processes both past and present. In some implementations, nodes related to past states can be omitted and only node values that lack edge information may be incorporated into the super-SFG. The super-SFG thus mimics the operation of a processor cache in that a node replacement policy ensures that older nodes that are not seen for some time are replaced with newer nodes.

Correlation of SFGs enables detection of new SFG nodes, which may be indicative of new processes or related new features in space and time. Detection of new SFG nodes may also be indicative of changed node values relative to what was observed previously (in time) or in other end points (in space) and shape. As the various end points may be in different states when the information is captured (e.g., not all virtual pages are loaded in memory depending on where execution is in an end point), it is not a requirement, for correlation, that an SFG identically match another SFG or that the associated graphs are even isometric. As described herein, new processes or related new features in space and time may be indicative of an existing or impending cyber-attack, or not, depending on the circumstances in which the new processes or related new features occur.

In some implementations, the example processes may correlate subgraphs of SFGs across multiple SFGs (including super-SFGs, known healthy SFGs, and/or attack genomes depending on the circumstances). The correlation may be based on SFG shapes. In this regard, in some implementations, each node records the shape of a succeeding subgraph. The shape is the form the subgraph. Each node also has a weight, which may be a type value pair. Type identifies the kind of node and value could be a hash or other information, such as a string or bit.

Subgraphs may include whole device graphs for a super-SFG or a part of an SFG for a device. For example, a device SFG may include device states over different times. A subgraph of the device's SFG may be for a particular time. Similarly, a device SFG may include subgraphs relating to states of processes with different processes running on the device. A subgraph of the device's SFG may represent a particular process. A subgraph may also include nodes and associated graphs under a particular node in an SFG.

A lack of SFG overlap at various subgraph levels identified during a correlation may be indicative of a potential attack, but is not necessarily dispositive. Rather, one or more metrics across space-time may be identified during different correlations to enable attack prediction and the creation of attack genome SFGs. The example processes identify overlapping nodes across SFGs and capture missing, and changes to, nodes' values, weights, and/or shapes relative to an overall SFG population. In some implementations, SFG comparisons may benefit from a focus on comparing graphs (and their subgraphs) that have the same top-level weights (e.g., same process names, modules, threads, or page hashes) and that are invariant unless changes occurred (e.g., due to cyber-attacks or updates).

In some implementations, a subgraph may be correlated across SFGs even if the subgraph's root node's weight value (e.g., name or hash) differs from previously-seen recorded root nodes. For example, if the name of a process has changed, but the process' virtual pages remain unchanged relative to previous versions, the process SFG nodes would be identical at different times, except for its root node. In this example, correlation would capture the name change and would indicate a non-malicious process, assuming that the other nodes have been confirmed as being healthy. On the other hand, the example processes may encounter a situation like that of polymorphic malware in which some root nodes may be identical, but many nodes below the root nodes (underlying nodes) have different weights and shapes that are similar to an attack genome (likely representing a version of known polymorphic malware). In this case, the example processes would report evidence of a malicious attack.

In some implementations, correlation is implemented, at least in part by, an example polynomial process that is executed, e.g., by one or more processing devices in the cloud. The example polynomial process includes operations first to find root nodes of SFGs having identical weights (e.g., representing hash values, file names, or port numbers), and then to find nodes having overlapping—e.g., the same or correlated—weight values. The correlation process continues until weights or shapes of the nodes under consideration diverge. In this context, divergence includes deviation from a predefined standard. In some implementations, SFG shapes may be analyzed independently of weight values. In some implementations, as an SFG is received by the correlation system (implemented, e.g., by one or more processing devices in a cloud service), the SFG nodes' attributes are analyzed relative to known healthy super-SFG, relative to known attack genome SFGs, and/or relative to attack genome super-SFGs (an attack genome, in some implementations, may be part of an attack genome super-SFG). In the case of comparison with a known healthy super-SFG, if a node has been seen before, the correlation process updates the super-SFG overlap metric.

The evolution metric of a node, such as a root node (e.g., a DLL, an application, or a part thereof), may be updated in a case where the node is identified as new based on a correlation of SFGs, but the node is confirmed to be a healthy. For instance, the example processes can designate nodes as healthy for emerging software updates to prevent them being flagged during correlation. The example processes, which implement correlation, may, in some examples, load such nodes autonomously if these nodes are encountered with a specified frequency in a time period across some subnets, which may indicate the occurrence of software upgrades. For example, these events could be correlated with previous evolution metrics in that same subnet for the same application or other software.

In an example where an SFG for a device is correlated to an attack genome, shape or node overlap between the SFG and the attack genome may indicate a cyber-attack. In some implementations, correlation with an attack genome constitutes a direct detection of malicious activity. An indication of an attack causes information (e.g., a warning) to be sent back to the device indicating the attack. The indication of the attack also causes attack genome SFG node attributes to be updated (e.g., overlap counts on the attack genome may be incremented).

Malicious activity may be suspected because nodes have changed, in some way, between a subject SFG and a super-SFG (e.g., a super-SFG that is known to be healthy). An example of an attack genome represents a malicious change to a DLL that is captured by a sub-SFG and that includes the changed nodes with their edges and some associated healthy nodes before and after the changed nodes. Any appropriate number of nodes before and after the changed nodes may be considered. For example, when malicious activity is suspected based on a result of a correlation process between a subject SFG and a super-SFG, an attack genome that reflects malicious system motion is generated. As described herein, the attack genome may be generated by extracting nodes from the subject SFG that have changed relative to their counterparts in the super-SFG, and also extracting one or more nodes around those changed nodes. An attack genome SFG is generated using those extracted nodes. The nodes may be appropriately annotated to indicate, e.g., how they have changed, when the changes occurred, how the changes relate to know malicious activity, and so forth.

Malicious activity may be suspected because nodes of a subject SFG are correlated, in some way to nodes of a super-SFG. When malicious activity is suspected based on a result of a correlation process between a subject SFG and a super-SFG, an attack genome that reflects malicious system motion may be generated. As described herein, the attack genome may be generated by extracting nodes from the subject SFG that have changed relative to their counterparts in the super-SFG, and also extracting one or more nodes around those changed nodes. An attack genome SFG is generated using those extracted nodes. The nodes may be appropriately annotated to indicate, e.g., how they have changed, when the changes occurred, how the changes relate to know malicious activity, and so forth.

In an example, in the case of packed malware, the malware's runtime version is actual decrypted code. Accordingly, the packed malware may be represented, graphically, by nodes and corresponding hash values. This is similar to a regular software process's SFG encoding. In the case of polymorphic malware, shape comparison of the subgraph following a node may indicate detection of malware. If an attack genome has been flagged as representing a polymorphic situation, shape comparison can be run at a higher priority relative to analyzing weight overlap and/or evolution. In the case of an APT, e.g., a planted backdoor could be identified in a process using a network socket in a context that has not been seen before. Other detection scenarios may be implicitly supported through correlations, in addition to these examples. As generation of an attack genome does not require an "exact match" of correlated SFGs, the attack genome can be used predictively across a network to identify or to infer an on-going or impending attack.

In some implementations, newly-generated SFGs can traverse a space-time SFG population and be correlated with both archived SFGs (which may or may not be known to be healthy) and attack genome SFGs. The first type of correlation—with already-archived SFGs—enables automated creation of additional attack genome SFGs that previous attack genomes may not cover. Correlation with known attack genome SFGs may enable faster cyber-attack detection as described above, since attack SFGs may be smaller in node/node size and also fewer in number than the potential pool of SFGs that can be correlated (even within a super-SFG). In some implementations, therefore, a correlation with attack genome SFGs may be performed before correlation with other archived healthy SFGs (or super-SFGs).

Due to the sophistication of cyber-attack threats, and their reliance on multiple steps/operations to compromise a system, an attack genome can be used to predict an attacker's next step (e.g., the next malicious system motion) and to trace an attack as the attack evolves. For example, attacks (including on critical systems) may follow multiple phases, such as reconnaissance, preparation, targeting, access, information exfiltration, and maintenance. Each of these phases can result in malicious system motion that may be captured by appropriate SFGs. Time-based correlation provides a perspective of progression within a region of network end points or other types of device(s) under consideration. Progression of a cyber-attack within a region may be identified using evolution metrics and anomalous network-access related nodes.

In some implementations, SFG and attack genome correlations can be augmented using a machine-learning approach, such as a sparse data inference or a Bayesian machine. Augmenting SFG and attack genome correlations in this manner can, in some cases, reduce false positives during prediction by filtering space-time relative motion that is ambiguous and possibly not due to cyber-attack. While space-time analysis in a relatively large population can yield unique ways to distinguish false positives, machine learning may be helpful. In some implementations, a false positive includes identification of a cyber-attack in a case where no cyber-attack is, in fact, occurring or predicted to occur.

As noted above, in some implementations, SFGs are represented by, and stored in memory as, property graphs. In some implementations, a property graph is an attributed, multi-relational graph. A property graph has edges that are labeled. Both nodes and edges of the property graph can have any number of key/value properties associated with them. The space-time population of SFGs in the cloud for a set of networked end points can be represented as a super-SFG, as described above. A super-SFG may comprise multiple property graphs merged together. In an example super-SFG, nodes having the same weights are collapsed into a single node. That single node includes associated property end points and timestamps from each of the collapsed nodes. The super-SFG encodes the sources of that information (e.g., the identifies of the collapsed nodes), but without replicating content if a node has previously been encountered.

Thus, a super-SFG may be a compressed representation of a set of past SFGs (from all or some considered set of end points). This type of representation in an SFG can reduce duplication of nodes, but preserve critical information that may be used for detection of malicious activity or cyber-attack. Each node in a super-SFG can have multiple incoming/outgoing edges that are themselves associated with end points, and that track a given path. By collapsing nodes, some of the correlation metrics can be calculated and updated for each node. For example, an overlap metric for a given node in a super-SFG may be identified by querying the number of end point IDs from a property set. Similarly, in some implementations, a shared-ness (or "sharedness") metric (described below) for a given node (e.g. that identifies processes using the same page(s) of code or accessing the same file(s)) can be measured by querying parent/grandparent nodes of a given type. In some implementations, all connected nodes that have type process for a given code page or file node may be queried by traversing the super-SFG. For example, each node (node) may be identified, and information associated with each node may be read by a querying device. In some implementations, a computer program may control information at each node, and may receive and respond to queries from devices about individual nodes.

Subgraphs depicting an individual SFG in a super-SFG, and associated correlation metrics, can be obtained from the super-SFG by querying nodes and edges identified by an end point ID. For example, each node or edge may be identified, and information associated with each node or edge may be read by a querying device. In some implementations, a computer program may control information at each node or edge, and may receive and respond to queries from devices about individual nodes or edges. In addition, the example processes described herein enable correlation across time by archiving the evolution history of SFGs over time (e.g., changes to SFGs over time). The resulting evolution metric can be determined by querying the number of times a particular node (and its associated subgraph) has changed for a given end point. In some implementations, adding nodes or edges to, or removing nodes or edges from, a graph, triggers a distributed event-driven update of the correlation metrics for associated nodes. Example processes for deriving and updating correlation metrics in an SFG are described below.

Figures 2, 2A, 2B, 2C:
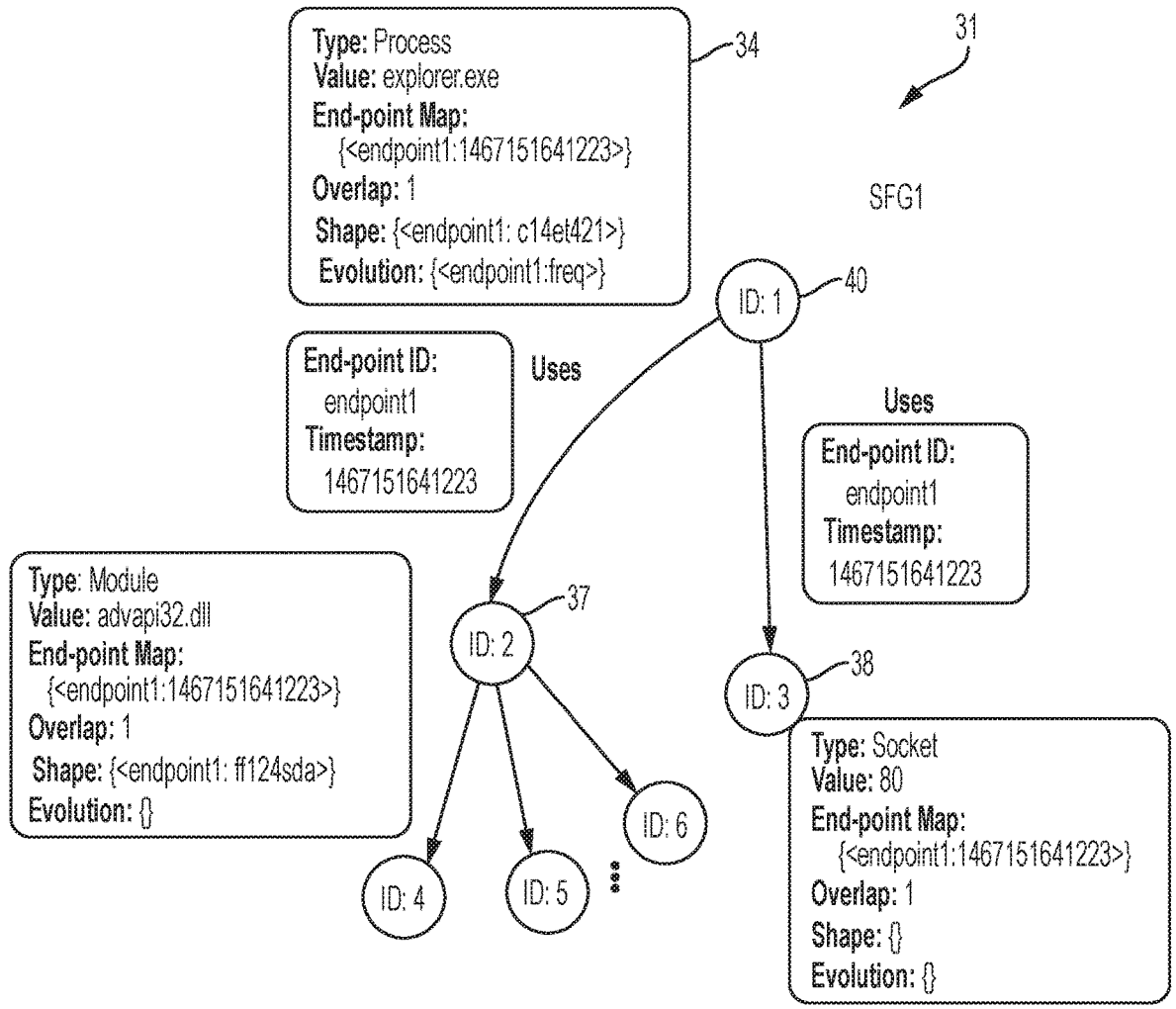
FIG. 2, comprised of FIGS. 2A, 2B, and 2C, shows generation of an example super-SFG from two individual SFGs.
Figure 2C:
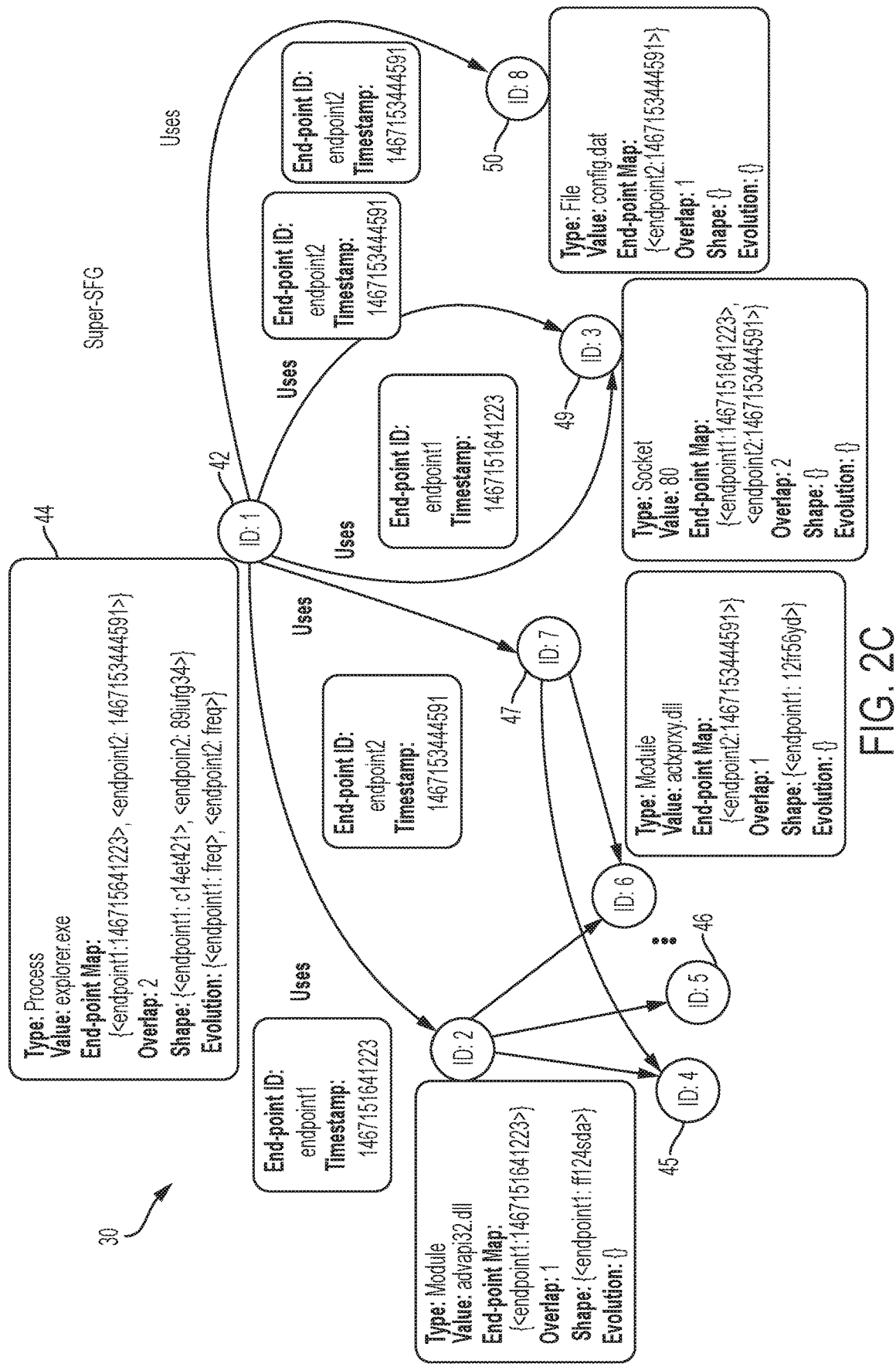

FIG. 2 shows an example super-SFG 30 (FIG. 2C) formed by merging example SFG1 31 (FIG. 2A) and example SFG2 32. (FIG. 2B). In FIG. 2, SFG1 31 and example SFG2 32 represent the same process (explore.exe) executing in different end point devices at the same time in a network. These SFGs (SFG1 and SFG2) are captured from different end points as indicated by the end point map attributes 34, 35 in their top nodes. SFG1 31 has six nodes, including four nodes for advapi32.dll (node 37) and one node 38 for a network socket node. SFG2 32 has six nodes, including nodes related to actxprxy.dll, a socket, and a file access. In this example, edges of the super-SFG 30 are annotated with their timestamps and end point source, intuitively representing uses/context for those nodes. The super-SFG 30 is configured to compress the two SFGs 31, 32 while maintaining key information following compression, with the key information including information that is usable to detect cyber-attacks of one or more types. Compression may include eliminating redundant nodes.

In this example, the resulting super-SFG 30 has collapsed the ID: 1 nodes 40, 41 from SFG1 and SFG2 into a new node ID: 1 42 and incorporated the attributes of nodes 40, 41, namely attributes 34, 35, into attributes 44 of node 42. Subsequently, the SFG1's advapi32.dll nodes are copied to the super-SFG, since there were no such nodes in SFG2. Similarly, SFG2's nodes related to actxprxi.dll are copied to the super-SFG unless SFG2's nodes are determined to overlap with nodes in advapi32.dll, in which case edges are drawn between appropriate nodes (e.g., between nodes 45, 46 and node 47) instead of copying those nodes. Since the socket node overlapped between the two SFGs, the socket node is represented with one node 49, with an incremented overlap count and a marking of the two end points from where this was observed. The file input/output (I/O) related node 50 is copied from SFG2 into the super-SFG since node 50 was not present in SFG1. After a super-SFG is formed, other node mergers occur similarly.

Example processes for performing space-time correlation are described herein. Described, for example, are processes for correlating an end point SFG and super-SFGs, although the processes may be performed to correlate two more regular (e.g., non-super) SFGs. The SFGs or super-SFGs that are subject to correlation may be attack genomes. Each of the metrics used in, or resulting from, the correlation(s) represents information about a state of one or more end points. This information may also be provided to an inference engine, which is programmed to make correlations across a collection of information and is also programmed to attempt to reduce the occurrences of false positives.

To represent SFGs, including attack genomes, in terms of graph theory, the following information is provided:
D=(V, E), V and E are finite sets; D is a population of Graphs (super-SFG)
v(w) denotes vertex node v with weight w in V
w=(type, value) is a tuple containing type and value type can be a process, thread, module, socket, page, etc. value can be a hash, file name, port number, etc. for the node The following notations address space-time considerations:
$D_i^t$: SFG for endpoint i at time t
An attack genome is annotated as follows:
A=(V, E), V and E are finite sets; where A is a subgraph of D Overlap is a metric that, in some implementations, addresses the frequency of occurrence of an individual node, v in D or A (across space and time). In other words, overlap represents the number of occurrences of overlapping nodes in two or more SFGs. If a new SFG is correlated with a super-SFG (that encapsulates multiple SFGs in space and time) and a node in the SFG is found to have the same weight as a node in the super-SFG, the super-SFG's overlap count in its matching node is indicative of the nodes history in space and time. Also, when the node is matched, the super-SFG's node overlap count is incremented since it is seen in the SFG again. That is, this metric relates to how many times a particular node having a same weight (e.g., type and value) has been observed. The metric can be used to indicate integrity violations or predictions of atypical state/behavior. For example, this happens when the SFG has a node (with a matching weight) that has a low overlap count in a super-SFG or when the super-SFG does not even include that node. Type refers to the vertex type such as a module, process, socket, file IO, registry key, code page for text section, code page for data section, etc. Value, for example, can be a hash for a virtual page for a node representing a page in a software process or underlying component, such as a DLL.

An example correlation process includes identifying a new page (e.g., through a new hash corresponding to the value for that node's weight) that has been previously unseen across space and time. "Unseen" refers to a construct that has not previously been encountered and that may, or may not, represent a cyber-attack, depending upon the circumstances. In this example, the overlap metric would indicate that there are no (or very few) other nodes in an SFG population having the type "Page" and having a matching value, e.g., a hash for the page. The view across space and time enables differentiating between malicious system motion and normal software updates. For example, in the case of updates (that is, a non-malicious action taken with respect to an end point), the same changes may also be seen in other end points. By contrast, malicious modifications would likely affect only one or very few end points, at least initially. Another example of a potentially malicious situation would be a previously unseen network port or file being open, which may be considered atypical state/behavior.

In some implementations, an overlap metric for each node can be measured in a super-SFG, and can be updated in the super-SFG each time an end point submits a new or updated SFG that is characterized as healthy. Pseudocode for an example correlation process 55 is shown in FIG. 3. The example correlation process represented by this pseudo code includes analyzing a node from the SFG that is under consideration. This is denoted as $v_i^t(w)$. Next, this node is correlated with nodes in the super-SFG. Weights of the nodes are compared as part of the correlation process. If there is match during the comparison, the process fetches the overlap count from the matching super-SFG node, increments the count (if this is the first time the SFG node and time is considered), and updates an end point map indicating that this end point/device has impacted the super-SFG node attribute overlap count. These operations are repeated for all SFG nodes. If a new node (having a non-matching weight) is encountered that is not present in the super-SFG, the new node is added and its overlap count is set to one. In this case a "PreviouslyUnseenNode" message is returned. Otherwise, a "PreviouslySeenNode" message is returned. The "PreviouslyUnseenNode" message indicates that the node was already present in the super-SFG, whereas the "PreviouslySeenNode" message indicates that the node was not already present in the super-SFG. In some implementations, the overlap metric is included on super-SFGs only. In some implementations, the overlap metric is included in both regular SFGs and super-SFGs.

In some implementations, for each node in a new SFG, the example correlation processes determine whether a super-SFG for that specific system configuration contains a node having the same weight ({type, value} tuple). If such a node is found in the super-SFG, the example processes add {end point-ID, timestamp}-tuple to the end point-map property (this is a map {i:[t1, t2, ... ]} containing a list of timestamps, t, when the node was observed/changed for end point i) for that node in the super-SFG. As explained above, the overlap-count property for that node in the super-SFG is then incremented to reflect the new observation. If a new node is being added, the overlap-count is set to one.

Other correlations based on overlap counts can also be performed. For example, an overlap-frequency metric is indicative of changes in behavior for a device, such as when a node occurs less frequently than its parent node. An overlap-frequency metric can be generated at different granularities by correlation(s) of different (or selected) SFGs across space and time. An example of this metric is a ratio between the overlap count in the super-SFG for an equivalent SFG node (if exists) and its parent node (if a corresponding node weight exists in the super-SFG). For example, an overlap-frequency metric can be generated for a file used by a given process by taking an overlap-count for the super-SFG node that corresponds to a file input/output node in the SFG and by dividing it by an overlap-count of the equivalent to the SFG parent node (e.g., the root or system node/node for the end point) in the super-SFG. If the frequency metric is found to be below a threshold, the frequency indicates anomalous behavior for that child node.

Pseudocode for an example correlation process 56 that involves an overlap frequency metric is shown in FIG. 4. Referring to FIG. 4, example correlation process 56 considers overall overlap counts and proceeds as follows: the example process analyzes a node in the SFG and attempts to find a node in the super-SFG having the same weight. The example process locates, in the super-SFG, a node having same weight as a parent node in the SFG. If nodes having the same weight exist in both the SFG and the super-SFG, then a ratio is determined by dividing the overlap counts in the super-SFG equivalent to the child and parent nodes in the SFG. In other words, the process identifies parent and child nodes equivalent to nodes ones in SFG. Then the process examines the overlap ratio in the super-SFG (which may not be in a regular SFG). This information determines how common it was, in the past, that the parent node was encountered together with that child node.

The variable "AtypicalBehaviour" result may be returned if the above overlap ratio is under a threshold or if one of the weights corresponding to the child or parent node in the SFG analyzed are not found in the super-SFG. The variable "AtypicalBehaviour" indicates that the device is exhibiting behavior that is not typical and, therefore, that may represent a cyber-attack. The foregoing process may be repeated for every child node in an SFG. If the ratio is calculated based only on the overlap count for a device in the super-SFG, a correlation with only the past behavior of the device may be obtained. If the ratio is calculated by considering other devices (e.g., in some subnet), then the correlation is relative to what has been seen in space (other devices).

The foregoing suggests a scenario in which a parent node has been encountered more frequently than a child node, e.g., a device is executing a file input/output that has not been seen more than a predefined amount of time. The example processes described herein may also determine how other devices in the same network performed, and determine how this would change considering a time interval instead of total overlap counts in the super-SFG.

The sharedness metric is a metric that is indicative of degrees of interconnectedness within SFGs. Sharedness in an SFG can be determined by counting the number of parent nodes of a given type (such as process, code page, module, registry key, socket, file 10, etc.) for a given node. For example, sharedness of a codepage among processes may be determined by counting the number of parent nodes of a certain type for that codepage node. If a node has only one parent node, then its sharedness is one. Referring to FIG. 5, an example process 57 (represented in pseudocode) proceeds as follows: for each node in the SFG in question, the example process counts parent nodes of certain type, which represents the sharedness correlation metric. The example process repeats this for nodes in the SFG until all nodes are checked. The example process then annotates the nodes traversed to represent their sharedness metric.

If the sharedness for an SFG node does not fall in an observed range in the super-SFG across space and time, the sharedness can be an indication of anomalous behavior, such as a malicious attack. The example correlation process 58 of FIG. 6 (represented in pseudocode) shows an example of this result. The example correlation process 58 considers all sharedness in the SFG and compares that sharedness in the SFG with equivalent sharedness for associated nodes in a healthy super-SFG. The example correlation process proceeds by comparing and returning a result indicative of anomaly when the sharedness in the super-SFG does not contain the type of sharedness observed in the SFG. The example correlation process iteratively counts sharedness for a super-SFG node by looking at its parent nodes of a certain type and by incrementing a variable called SRange. In an example, sharedness of code pages is to be expected across processes using the same dynamic link libraries (DLLs) (e.g., system DLLs especially). Processes not sharing certain pages of code could be an indication of a modified/hooked system DLL, for example.

The contiguous metric is a metric that is indicative of contiguous related behavior/state attributes across several nodes in an SFG. Generally, the contiguous metric is a measure of a level of similarity between subgraphs in SFGs. For example, a subgraph in an SFG may be seen in a super-SFG. This means that the state the SFG is representing in that subgraph was seen before in that particular configuration across space and time. This provides more information than seeing individual nodes from the SFG in the super-SFG. This metric may be useful in predicting malicious system motion. In an example, contiguous nodes $v_i$ to $v_k$ belong to a subgraph that matches other subgraphs across space and time (e.g., in a super-SFG) and corresponds to a state/behavior that is unchanging across space and time. Nodes that are contiguous, but not matching, across a specified number of SFGs represent system motion across space or time that may be indicative of anomalous behavior. Such suspicious system motion can include, but is not limited to, inclusion of new files or sockets used by a process that differ across space and time.

Pseudocode for an example correlation process 59 is shown in FIG. 7. Referring to FIG. 7, example correlation process 59 performs an analysis to determine if a set of contiguous nodes belonging to a subgraph at a given node is in a super-SFG. This example process proceeds as follows: given an SFG for a device at time t, the example process picks a node in the SFG and queries the super-SFG (typically a healthy super-SFG) to identify a node having a same weight. The outcome may be that the example process does not find such a node in the super-SFG, in which case the example process adds the node to a set indicating that the subgraph failed a contiguousness check. Otherwise, the example process continues to perform the same analysis on its child nodes and to compare those child nodes with corresponding child nodes in the super-SFG. When a node fails to match, the failed-match node is added to a set of nodes that do not match counterpart nodes in a healthy super-SFG. When repeated for all nodes in the SFG, the result is a set containing nodes that failed contiguousness checks relative to the super-SFG. An example process that determines whether nodes in multiple SFGs are contiguous rectums a set of nodes where the subgraph containing a set of contiguous nodes do not overlap after correlation with a super-SFG. An empty returned set by the example process indicates that all nodes in the end point SFG passed the contiguousness check relative to the super-SFG.

The shape metric is a metric that is indicative of the structure of a graph/subgraph under a node of interest (e.g., number of nodes, number of edges, how the nodes connect to the edges, and so forth). Shape analysis may be used in predicting malware that may have been generated using a malware "kit". These kits are used to generate malware where certain aspects, such as file names, are randomized across generated malware. These techniques are able to create malware having unique signatures that evade malware scans even though each malware instance is fundamentally the same. In some implementations, shape analysis is able to correlate, across SFGs, the shape of new malware generated by a kit with the shape of previously-encountered malware.

In this regard, nodes in a super-SFG stored, e.g., in the cloud, have a shape-map property (this is a map containing {shapeHash: {end pointID: time}} that identifies which end point had a given shape and at what time. In some implementations, hashing a string-based representation of the graph structure under a node captures information about this property. Pseudocode for an example correlation process 60 is shown in FIG. 8. Referring to FIG. 60, an example shape extraction process 50 proceeds as follows. The example process starts by considering an SFG for an end point at a given time. The example process calculates the shape of a node of the SFG, starting from leaf nodes upwards, recursively. This may be done by hashing a string of information extracted about the shape of an underlying sub-SFG(s). This hashed information may contain concatenated information about bit-encoded depth, type of the node, number of children nodes, and metadata about the shape of any children nodes (e.g., including hashes and types). The metadata of the children nodes incorporates the shape of the children nodes into the shape information for the parent node recursively as the example process proceeds from bottom nodes upwards. The example process visits the SFG layer-by-layer until the root node is reached and, in the process, calculates the shape for each node. The example process includes functions to communicate metadata between parent and children nodes through create, get, and send messages. Other implementations may share this information in different ways.

An example process for correlating shapes among SFGs includes determining a hash of a subgraph shape rooted at each node in an end point SFG. Then, each node shape is correlated against the node shapes in an attack genome SFG database. A direct match with a genome SFG shape at any level may indicate the presence of malware or a general cyber-attack. If no direct match is found with any attack genomes, then the shape for each node is checked against a healthy super-SFG space time population. In case there is no match found for a given node and its subgraph, then further correlation can be performed based on other metrics to detect anomalous behavior. If a given end point SFG is characterized as healthy, the super-SFG is updated with the new set of shapes for each node.

The evolution metric is indicative of a rate of change for a given node as observed by its subgraph(s) (or tree rooted at the node). The example processes may determine an evolution metric for an SFG over time. An example analysis to determine an evolution metric can reveal trends over time, such as the rate at which a process' nodes (e.g., code pages) change over time. Evolution for a given node and in a super-SFG can be extracted by examining the timestamps for each end point from an end point-map property. In an example, a new entry is added to an end point-map only if a change was observed in an end point SFG that was submitted and characterized as healthy. If the time difference among a set (e.g., all) recorded timestamps yields the same value, an evolution pattern is established. For example, an evolution pattern may be established that indicates weekly updates to end points. A range of valid evolution periods across all end points can be maintained at each node. An example use for the evolution metric is to establish a baseline for how often a certain process experiences change under normal circumstances. If a change is detected in an end point SFG outside of an established evolution pattern, that change may indicate atypical behavior and could be cross-checked with other space-time metrics to predict a cyber-attack.

Pseudocode for an example correlation process 61 is shown in FIG. 9. Referring to FIG. 9, example correlation process 61 proceeds as follows. The example process considers an SFG for a device at a time t. The example process identifies a node of this SFG and queries a super-SFG for a node having the same weight as the identified node. If a node having same weight is found, the example process queries historical information for that node, including all timestamps for that node that were recorded as having a change of their SFG. The change may include, e.g., a change in the shape of an SFG (e.g., one or more nodes added) or a change in which one or more nodes were replaced but the shape of the SFG remained unchanged. The example process searches the super-SFG to identify a set of evolution cycles in the super-SFG (denoted by $E_{range}$), and determines whether the SFG's current cycle is within that set (or compatible with that evolution set). The current SFG evolution cycle is related to the time interval from a last time the super-SFG recorded evolution to a current time (or $t-t_0$). While the example process considers this difference as a possible cycle to match within the set, the example process can also perform this correlation without requiring an exact match, e.g., by allowing a constant factor difference from any cycle in the super-SFG set at that node. This process may be repeated for all SFG nodes.

Figure 10:
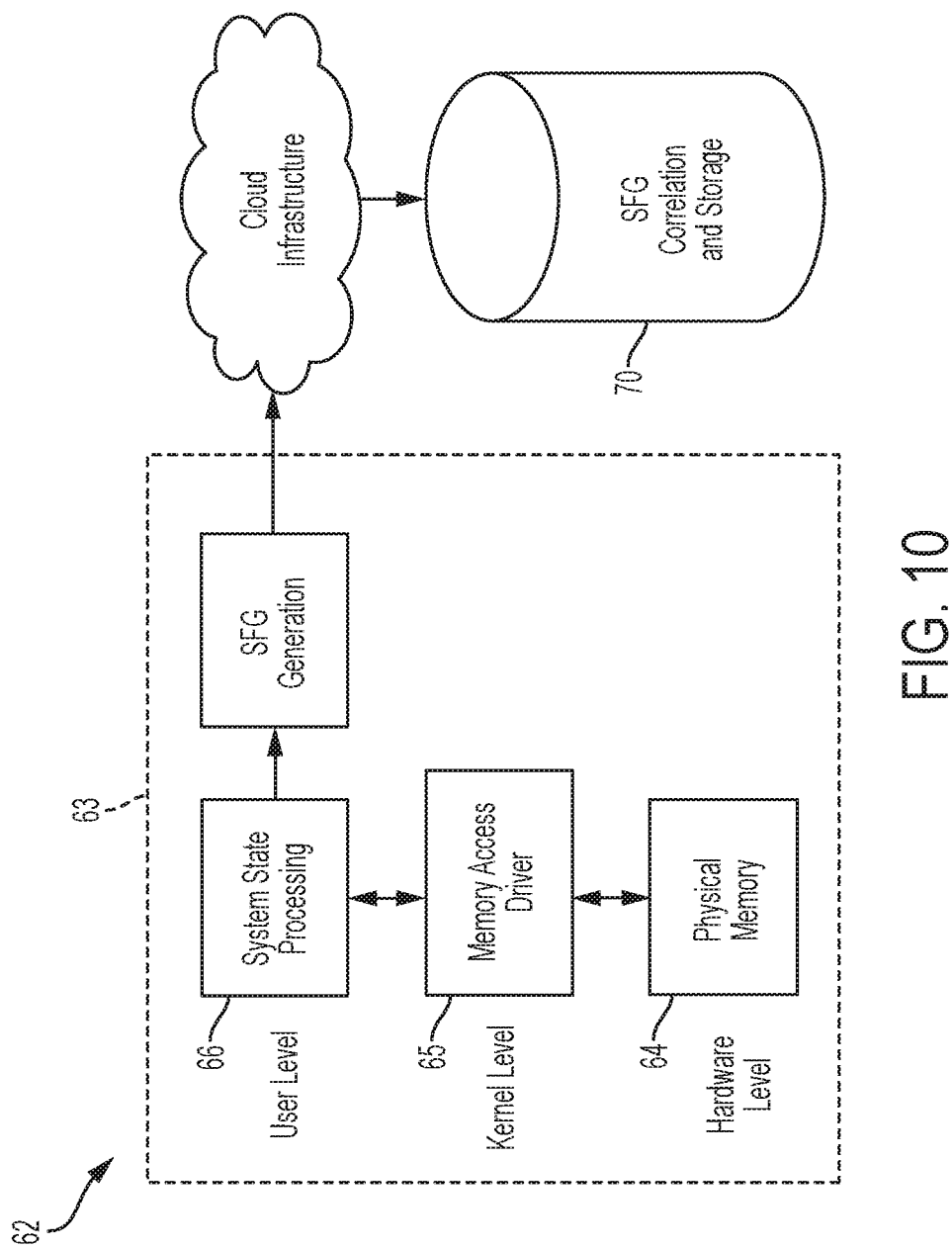
FIG. 10 is an example of a system for generating an SFG.

Referring to FIG. 10, an example system 62 (hardware and software) for generating SFGs for a network end point 63 is shown. End point 63 includes elements 64, 65, 66, and 67. An SFG driver (not shown) accesses physical memory 64 through a memory access driver 65. The SFG driver then performs system state processing 66 (e.g., by performing reverse engineering or other processing on memory content) to determine system state through analyses such as those described herein including, but not limited to, page table traversal. SFG generator 67 generates SFGs by generating a property graph based on the results of the system state processing 66. As part of the generation process, the SFG generator 67 generates node value hashes and other metrics, as appropriate. The resulting SFG may be passed on to the cloud-based SFG correlation engine and storage 70. SFGs and super-SFGs generated therefrom may be stored in the cloud in memory or in other appropriate network storage.

Figure 11:
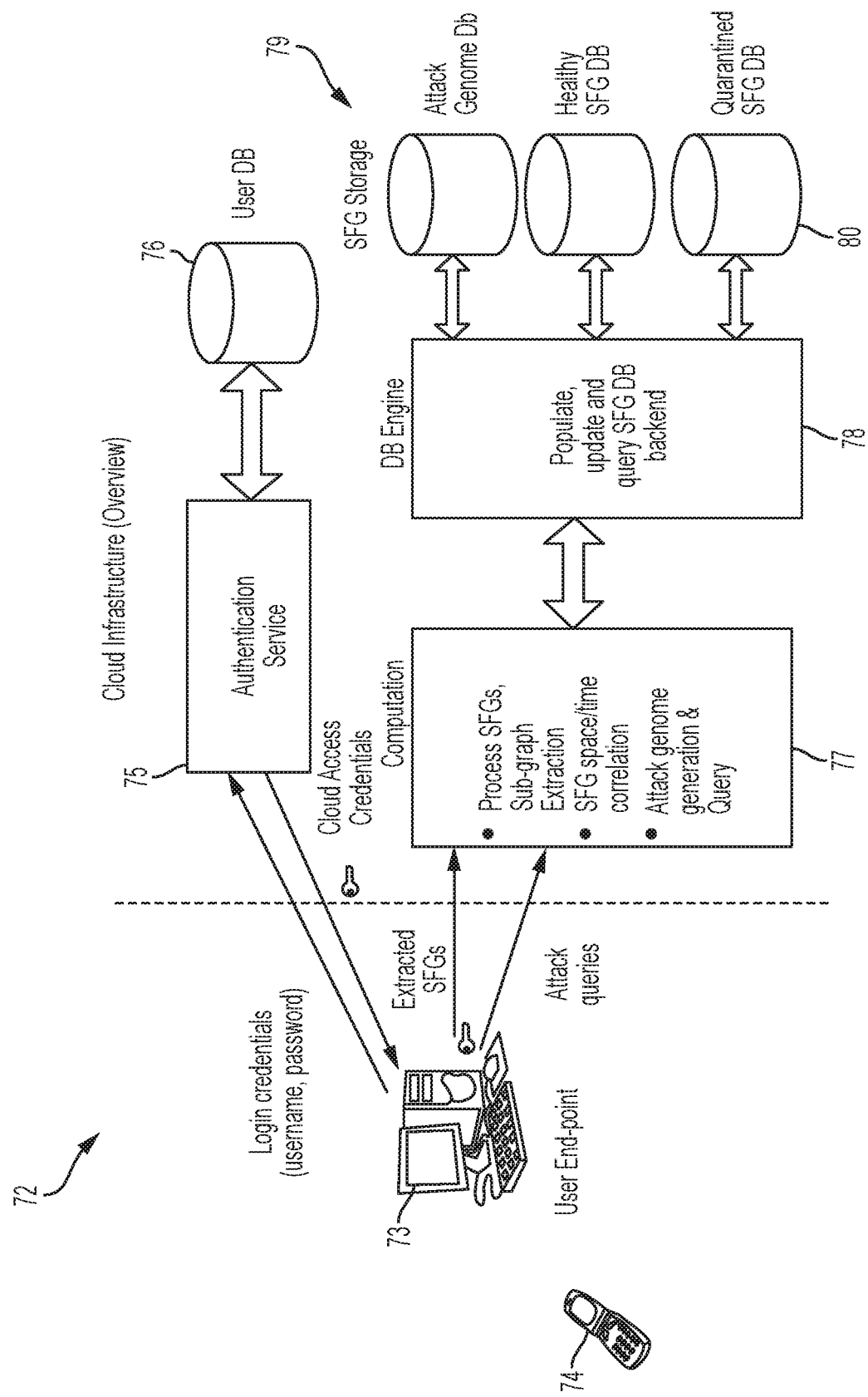
FIG. 11 is an example of a network on which the example processes described herein may be performed.

Referring to FIG. 11, an example cloud service architecture 72 is shown, which may be used to implement the example processes described herein. The example architecture supports end point cyber defense, malware detection, and/or detection of a cyber-attack. Examples of end points include, but are not limited to, computer 73, mobile device 74, or other networked systems (not shown). In operation, an end point is authenticated via authentication service 75, which may be part of the cloud infrastructure 72. Authentication service 75 performs authentication, in this example, by identifying a user in user database 76. This may be done based on login credentials, such as a username and password.

Following authentication, the end point SFG driver (of FIG. 10) may submit a generated SFG and/or query for an attack. This query can contain additional information beyond the SFG and specific questions being asked. Computation unit 77 (e.g., one or more processing devices) is configured or otherwise programmed to process SFGs for subgraph extraction, running correlation processes in space and time, and generating attack genome SFGs in cases where new types of attacks are discovered. SFGs in space-time are accessed via DB engine 78 that diverts updates, or queries to corresponding databases in SFG storage 79. These databases include information representing or otherwise defining attack genome DB that contains synthesized attack genomes (SFGs), healthy SFG DB that contain SFGs and/or super-SFG(s) for known healthy states, and quarantined SFG DB that contains suspicious SFGs.

When an SFG is processed by the system of FIG. 11 according to the example processes described herein, there may be several outcomes: correlation with attack genome could indicate an ongoing attack; if that is not the case, correlation with a healthy SFG could indicate a benign SFG; if that is not the case, while there are correlations indicating a new type of system motion, the SFG can be quarantined in quarantined DB 80. More specifically, the system described herein may include databases containing three categories of SFGs: attack-related (attack genomes), healthy-super SFGs, and SFGs that are yet to be categorized (and therefore may be suspicious). The quarantined SFGs are known to not match the attack genomes, but are known to contain something not found in the healthy SFGs. Thereafter, the system may synthesize new attack genomes that may be stored in an attack genome DB for future use. In some cases, the SFGs could be correlated and called benign as may be the case for software updates in a network. In this case, such SFGs are stored and/or merged with super-SFG(s) in a healthy SFG DB for future correlations. All or part of the processing described herein may employ the assistance of a machine learning sub-system.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

All or part of the systems and techniques described herein, as appropriate, can be implemented in one or more computing systems that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing systems can include clients and servers. A client and server are generally remote from each other and typically interact through a communication network. The relationship of client and server arises by virtue of computer programs running on the respective computers and having a client-server relationship to each other.

All processes described herein and variations thereof (referred to as "the processes") may contain functionality to ensure that party privacy is protected. To this end, the processes may be programmed to confirm that a users membership in a social networking account is publicly known before recommending a connection to that user through the social networking account. Likewise, the processes may be programmed to confirm that information about a party is publicly known before divulging that information to other party, or even before incorporating that information into a social graph. In the context of this disclosure, the terms social network and social networking service may be used interchangeably.

In this document, relative words such as "multiple", "many", "large", "small", etc. do not have any specific numerical connotation, but rather indicates some number that is at, or that is greater than, an appropriate threshold, which may be set beforehand or determined dynamically.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:
1. A method performed by one or more processing devices, comprising:
    generating a first graph that models states based on information obtained from an electronic device, the first graph comprising nodes containing the information and edges between the nodes that comprise the states;

performing a correlation of the first graph with at least two second graphs to detect a possibility of a cyber-attack against the electronic device, wherein the correlation determines whether a first node of the first graph overlaps a second node in at least one of the at least two second graphs, the first graph being separate from the at least two second graphs, where the first node overlaps the second node if the first node and the second node have the same weight;

wherein the at least two second graphs comprise an attack graph containing information about malicious cyber activity;

notifying the electronic device in the event that the possibility of the cyber-attack is detected based on the correlation; and wherein the at least two second graphs comprise a device graph that models states based on information obtained from the electronic device at a different time than the first graph.

2. The method of claim 1, wherein the at least two second graphs comprise one or more graphs that are known not to be subjected to cyber-attack.

3. The method of claim 1, wherein the at least two second graphs comprise one or more graphs containing nodes having properties that are suspected to be a result of a cyber-attack.

4. The method of claim 1, wherein the electronic device is a first electronic device, and the at least two second graphs comprise one or more graphs for second electronic devices, the second electronic devices being different than the first electronic device.

5. The method of claim 1, wherein the at least two second graphs comprise a combined super-graph comprised of merged individual graphs, where a node common to the individual graphs appears as a single node in the combined super-graph.

6. The method of claim 1, wherein the correlation determines whether a shape of at least part of the first graph has one or more features in common with a shape of at least part of one or more of the second graphs.

7. The method of claim 1, wherein the correlation determines whether contiguous nodes of the first graph belong to a subgraph that matches other subgraphs across space and time.

8. The method of claim 1, wherein the correlation determines whether the first node of the first graph has changed in a manner that coincides with changes to the second node of the at least one of the second graphs.

9. The method of claim 1, wherein the correlation determines a number of times that the first node of the first graph appears in the at least two second graphs.

10. The method of claim 1, further comprising:
providing the electronic device with information about the possibility of the cyber-attack.

11. The method of claim 1, further comprising:
characterizing the electronic device as healthy based on the correlation indicating that there is no cyber-attack against the electronic device.

12. The method of claim 1, further comprising:
characterizing the electronic device as compromised based on the correlation indicating that there is a cyber-attack against the electronic device.

13. The method of claim 1, further comprising:
quarantining the first graph based on the correlation.

14. The method of claim 1, wherein generating the first graph comprises:
performing reverse engineering to identify locations of memory on the electronic device;
accessing the locations of memory on the electronic device to obtain information about states of the electronic device; and
constructing the first graph based on the information.

15. The method of claim 1, wherein the first graph is generated based on information obtained from a binary executable for a known malware executable file.

16. The method of claim 1, wherein the first graph is generated to reflect changes to states of the electronic device.

17. The method of claim 1, wherein the correlation of the first graph is performed by a cloud service; and
wherein the method further comprises transmitting the first graph to the cloud service differentially.

18. The method of claim 1, wherein the correlation of the first graph is performed by a cloud service; and
the method further comprises:
compressing the first graph to produce a compressed graph; and
transmitting the compressed graph to the cloud service differentially.

19. The method of claim 1, wherein generating the first graph comprises:
identifying locations of live memory on the electronic device;
accessing the locations of live memory on the electronic device to obtain information about states of the electronic device; and
constructing the first graph based on the information.

20. The method of claim 1, wherein generating the first graph comprises:
obtaining information from a dump of memory on the electronic device; and
constructing the first graph based on the information.

21. One or more non-transitory machine-readable storage media storing instructions that are executable by one or more processing devices to perform operations comprising:
generating a first graph that models states based on information obtained from an electronic device, the first graph comprising nodes containing the information and edges between the nodes that comprise the states;
performing a correlation of the first graph with at least two second graphs to detect a possibility of a cyber-attack against the electronic device, wherein the correlation determines whether a first node of the first graph overlaps a second node in at least one of the at least two second graphs, the first graph being separate from the at least two second graphs, where the first node overlaps the second node if the first node and the second node have the same weight;
wherein the at least two second graphs comprise an attack graph containing information about malicious cyber activity;
notifying the electronic device in the event that the possibility of the cyber-attack is detected based on the correlation; and
wherein the at least two second graphs comprise a device graph that models states based on information obtained from the electronic device at a different time than the first graph.

22. A system comprising:
one or more processing devices; and one or more non-transitory machine-readable storage media storing instructions that are executable by the one or more processing devices to perform operations comprising:
  generating a first graph that models states based on information obtained from an electronic device, the first graph comprising nodes containing the information and edges between the nodes that comprise the states;
  performing a correlation of the first graph with at least two second graphs to detect a possibility of a cyber-attack against the electronic device, wherein the correlation determines whether a first node of the first graph overlaps a second node in at least one of the at least two second graphs, the first graph being separate from the at least two second graphs, where the first node overlaps the second node if the first node and the second node have the same weight;
  wherein the at least two second graphs comprise an attack graph containing information about malicious cyber activity;
  notifying the electronic device in the event that the possibility of the cyber-attack is detected based on the correlation; and
  wherein the at least two second graphs comprise a device graph that models states based on information obtained from the electronic device at a different time than the first graph.

23. The one or more non-transitory machine-readable storage media of claim 21, wherein the at least two second graphs comprise one or more graphs that are known not to be subjected to cyber-attack.

24. The one or more non-transitory machine-readable storage media of claim 21, wherein the at least two second graphs comprise one or more graphs containing nodes having properties that are suspected to be a result of a cyber-attack.

25. The one or more non-transitory machine-readable storage media of claim 21, wherein the electronic device is a first electronic device, and the at least two second graphs comprise one or more graphs for second electronic devices, the second electronic devices being different than the first electronic device.

26. The one or more non-transitory machine-readable storage media of claim 21, wherein the at least two second graphs comprises a combined super-graph comprised of merged individual graphs, where a node common to the individual graphs appears as a single node in the combined super-graph.

27. The one or more non-transitory machine-readable storage media of claim 21, wherein the correlation determines whether a shape of at least part of the first graph has one or more features in common with a shape of at least part of one or more of the second graphs.

28. The one or more non-transitory machine-readable storage media of claim 21, wherein the correlation determines whether contiguous nodes of the first graph belong to a subgraph that matches other subgraphs across space and time.

29. The one or more non-transitory machine-readable storage media of claim 21, wherein the correlation determines whether the first node of the first graph has changed in a manner that coincides with changes to the second node of the at least one of the second graphs.

30. The one or more non-transitory machine-readable storage media of claim 21, wherein the correlation determines a number of times that the first node of the first graph appears in the at least two second graphs.

31. The one or more non-transitory machine-readable storage media of claim 21, wherein the operations comprise:
  providing the electronic device with information about the possibility of the cyber-attack against the electronic device.

32. The one or more non-transitory machine-readable storage media of claim 21, wherein the operations comprise:
  characterizing the electronic device as healthy based on the correlation indicating that there is no cyber-attack against the electronic device.

33. The one or more non-transitory machine-readable storage media of claim 21, wherein the operations comprise:
  characterizing the electronic device as compromised based on the correlation indicating that there is a cyber-attack against the electronic device.

34. The one or more non-transitory machine-readable storage media of claim 21, wherein the operations comprise:
  quarantining the first graph based on the correlation.

35. The one or more non-transitory machine-readable storage media of claim 21, wherein generating the first graph comprises:
  performing reverse engineering to identify locations of memory on the electronic device;
  accessing the locations of memory on the electronic device to obtain information about states of the electronic device; and
  constructing the first graph based on the information.

36. The one or more non-transitory machine-readable storage media of claim 21, wherein the first graph is generated based on information obtained from a binary executable for a known malware executable file.

37. The one or more non-transitory machine-readable storage media of claim 21, wherein the first graph is generated to reflect changes to states of the electronic device.

38. The one or more non-transitory machine-readable storage media of claim 21, wherein the operations comprise:
  compressing the first graph to produce a compressed graph; and
  transmitting the compressed graph to the cloud service differentially.

39. The one or more non-transitory machine-readable storage media of claim 21, wherein generating the first graph comprises:
  identifying locations of live memory on the electronic device;
  accessing the locations of live memory on the electronic device to obtain information about states of the electronic device; and
  constructing the first graph based on the information.

40. The one or more non-transitory machine-readable storage media of claim 21, wherein generating the first graph comprises:
  obtaining information from a dump of memory on the electronic device; and
  constructing the first graph based on the information.

* * * * *